June 8, 1954 W. T. REA 2,680,777

ELECTRONIC SWITCHING CIRCUIT

Filed Sept. 28, 1950 6 Sheets-Sheet 1

INVENTOR.
WILTON T. REA

BY R. C. Terry

ATTORNEY

June 8, 1954 W. T. REA 2,680,777

ELECTRONIC SWITCHING CIRCUIT

Filed Sept. 28, 1950

6 Sheets-Sheet 2

INVENTOR.
WILTON T. REA

BY R. C. Terry

ATTORNEY

June 8, 1954 W. T. REA 2,680,777

ELECTRONIC SWITCHING CIRCUIT

Filed Sept. 28, 1950 6 Sheets-Sheet 3

INVENTOR.
WILTON T. REA

BY R. C. Terry

ATTORNEY

June 8, 1954 W. T. REA 2,680,777

ELECTRONIC SWITCHING CIRCUIT

Filed Sept. 28, 1950 6 Sheets-Sheet 4

INVENTOR.
WILTON T. REA
BY R. C. Terry
ATTORNEY

INVENTOR.
WILTON T. REA
BY R. C. Terry
ATTORNEY

June 8, 1954 W. T. REA 2,680,777

ELECTRONIC SWITCHING CIRCUIT

Filed Sept. 28, 1950 6 Sheets-Sheet 6

INVENTOR
WILTON T. REA
BY R. C. Perry
ATTORNEY

Patented June 8, 1954

2,680,777

UNITED STATES PATENT OFFICE 2,680,777

ELECTRONIC SWITCHING CIRCUIT

Wilton T. Rea, Manhasset, N. Y., assignor to Bell Telephone Laboratories, Incorporated, New York, N. Y., a corporation of New York Application September 28, 1950, Serial No. 187,330

24 Claims. (Cl. 178—2)

This invention relates to an electronic switching system and, more particularly, pertains to electronically operated distributors or commutators for electronic switching circuits.

The invention is particularly applicable to the transmission of telegraphic signals, and to the interpretation of the transmitted signals at the receiver.

According to the invention, a cyclic switching system, or "distributor," is composed of a plurality of thermionic discharge devices which, for simplicity, will be called "distributor tubes"; distributor tubes are associated with individual signal sources. It is the duty of the distributor to provide a cyclic connection from each of the signal sources associated with the individual distributor tubes to a common line for a given interval of time. The time interval over which a distributor tube connects the associated signal source to the common line is called a distributor "segment."

The distributor tubes are individually controlled by a source of oscillatory potential provided with output terminals from which may be derived a plurality of alternating control voltages differing from each other by fixed phase angles. The distributor tubes have one or more control elements which are connected to these terminals through discrete impedance networks having certain values; during one cycle of the source of oscillatory potential, each tube will be rendered conductive for an interval of time equal to the segment desired at that distributor tube. The segment width, or time during which any one tube is rendered conductive, is a function of the combination of alternating control voltages utilized and the impedance network through which these voltages are applied to the control elements of that one distributor tube. The segments or conductive periods of the various distributor tubes may be rendered of equal or unequal time width; they may be made successive or overlapping in time; and may succeed one another with or without intervening time intervals, dependent entirely upon the choice of alternating control voltages and the impedance networks cooperating with the individual distributor tubes.

The art of communication has employed distributor switching circuits for sequential synthesis and analysis of a group of signals in order that the intelligence contained therein might be transmitted over a single line. Signal transmission systems employing such distributors are often called "time division" systems. In the past, mechanical distributors having a plurality of contact segments have been utilized. Each of the segments of such distributors is connected to a signal source, and a slider arm or other means is provided to make sequential contact with the various segments, sampling the signal of each segment for a short and measured period of time. Such a distributor is shown in United States Patent No. 1,566,295, to E. F. Watson, issued December 22, 1925. It is known also to perform such an operation electrically by the use of sequentially self-energizing multivibrator rings as in copending United States application Serial No. 128,395, filed November 19, 1949, by A. Weaver, now U. S. Patent No. 2,626,994, dated January 27, 1953.

To explain the invention more fully, one embodiment of a distributor according to the invention will be described as applied to a telegraphic system. In one telegraph system, it is known to provide transmitting and receiving systems employing transmitting and printing equipment of the "start-stop" type, utilizing a rotary mechanical transmitting distributor controlled by a perforated tape and a rotary mechanical receiving distributor for controlling a selector mechanism. Such a machine may be of the type described in United States Patent No. 1,904,164, to S. Morton et al., granted April 18, 1933.

Such "start-stop" automatic telegraphic systems have employed mechanical transmitters operated by means of the aforementioned perforated tape, transforming the tape's perforations into groups of electrical impulses. These impulses are transmitted by time division via a transmission medium or line to some remotely located receiving position. Such transmitting apparatus is described in United States Patent No. 2,055,567, to E. F. Watson, granted September 29, 1936. At the receiving position, the impulses are interpreted, and the letters or symbols to be transmitted are thereupon caused to be printed.

While the example, to which the distributor of the invention is applied, utilizes transmitting and printing equipment of the "start-stop" type, it is to be understood that such equipment is shown for the purpose of illustration only. The distributor, according to the invention, is not limited to transmitting and printing telegraphic equipment or to telegraphic equipment, but is applicable generally to communication systems of the time division or multiplex type, to electronic switches and selectors, and to telemetering and synchronizing circuits generally.

The principal object of the invention is to provide a cyclic electronic switching system having segments of equal or unequal time width, successive or overlapping in character, and succeeding one another with or without intervening time intervals. In accordance with another aspect of the invention, means are provided to transmit and receive time division telegraph signals with cyclic switching system.

The invention is described in detail in the following specification:

Fig. 1*a* shows a simplified equivalent schematic circuit of a switching segment, included for the purpose of explanation;

Fig. 1*b* is a timing diagram of the circuit of Fig. 1*a*;

Fig. 5b shows a detailed view of a portion of the mechanism of 5a.

Throughout the specification, batteries are indicated as sources of direct-current potential. It will be obvious to one skilled in the art that such sources may be alternating-current rectifiers, or a single rectifier or battery in conjunction with appropriate voltage dividers where necessary.

Figure 1A:
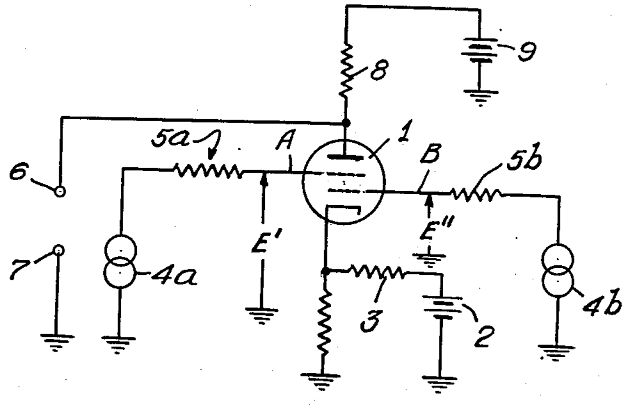
Fig. 1c shows a schematic diagram of one switching segment in accordance with the invention.

Referring now to Fig. 1a, there is shown a thermionic discharge tube 1 having a cathode, anode and two control elements or "grids" A and B. Each of the control grids A and B is capable of arresting the anode-cathode current flow of the tube.

It is assumed that a voltage E' is developed by voltage source 4a through a resistance 5a to grid A. The resistance 5a may be considered to have a value R and:

$$E'=\tfrac{1}{2}\sqrt{2}\,E\sin(\omega t+\theta_a) \quad (1)$$

In this equation E' is a sine wave having a maximum amplitude E; a frequency of $f$, where $\omega=2\pi f$; $t$=time; and $\theta_a$ is a constant phase angle. Similarly, a voltage E'' is supplied from source 4b resistance 5b to grid B, where:

$$E''=\tfrac{1}{2}\sqrt{2}\,E\sin(\omega t+\theta_b) \quad (2)$$

The magnitude value of Equation 2 is exactly the same as Equation 1 with the exception that a new constant phase angle, $\theta_b$, is introduced.

Voltages E' and E'' will be identical in wave form and magnitude, differing only in phase. This phase difference will be 180 degrees, because of the negative sign of voltage E'', with an additional difference, $\theta\Delta$, due to the difference between the constant phase angles $\theta_a$ and $\theta_b$.

The energizing circuits of the tube 1 may be arranged so that its anode-cathode current will be cut off during all negative excursions of the voltage E'. Thus, for one-half of each cycle of the sine wave of E', the tube will be non-conducting and during the subsequent half cycle, will be capable of conducting.

Figure 1B:
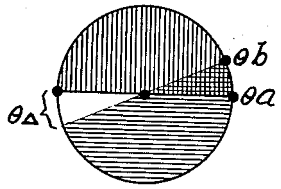

Referring to Fig. 1b, if the circle represents a single sine wave cycle starting at $\theta_a$ as 0, an excursion of $2\pi$ radians of the voltage E' will have the upper portion of the circle representative of the first half cycle of the sine wave E'. E' will be positive over this half cycle. The vertically shaded portion then represents the angular period when control grid A permits current to flow.

Similarly with control grid B, negative excursions of the voltage E'' provide periods when the tube 1 cannot conduct, positive excursions of grid B providing possible periods of conduction. It has been noted that the expressions for voltages E' and E'' differ from each other in that the expression of voltage E'' is negative, or shifted $\pi$ radians and also includes an additional phase angle difference, $\theta\Delta$.

The conductive period offered by the control grid B is shown in Fig. 1b, the conductive period being advanced $\pi$ radians over the conductive period of control grid A by virtue of the negative sign of voltage E'', plus an additional phase displacement, $\theta\Delta$, caused by the difference in phase angles $\theta_a$ and $\theta_b$. The total part of the cycle in which control grid B will permit current flow is represented by the horizontally shaded portion of Fig. 1b.

Examination of Fig. 1b shows that the only period of time during which anode-cathode current can flow in tube 1 is that sector of time where the conductive possibilities of the control grids A and B coincide. This sector coincides with the phase angle difference between the two voltages, $\theta\Delta$. At all other times, either grid A, grid B or both grids will block the flow of current, and tube 1 will remain non-conducting.

By shifting the phase angle difference, $\theta\Delta$, between $\theta_a$ and $\theta_b$, the sector of conduction may be controlled and the corresponding time over which tube 1 will draw anode-cathode current may be lengthened or shortened. By exciting the grids A and B of the tube 1 between the point of saturation and cut-off, depending upon the voltage of the grid cycle, a substantially square wave voltage may be obtained. This excitation may be controlled, inter alia, by manipulation of the magnitudes of battery 2 and resistance 3. Thus, a voltage will appear at terminals 6 and 7 inversely proportional to the anode-cathode current drawn by tube 1; during the times tube 1 is non-conducting, the voltage at terminals 6 and 7 will substantially equal the voltage of battery 9. When tube 1 conducts, the anode current of the tube produces a voltage drop across resistance 8, depressing the voltage at terminals 6 and 7. As the tube goes through the cycle of non-conduction, conduction and non-conduction, a wave, having susbtantially a square envelope, will be generated at the terminals 6 and 7.

An empirical expression for voltage, V, supplied to control grids A and B, could be:

$$V=\tfrac{1}{2}\sqrt{2}\,E\sin(\omega t+\theta)$$

Figure 2A:
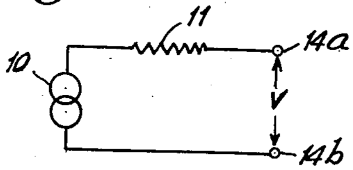
Figs. 2a and 2b are equivalent diagrams of the phase shifting network according to the invention included for the purpose of illustration.

Generator-resistance combination 10 and 11, having a circuit as shown in Fig. 2a, may be assumed to develop this voltage. The voltage, V, produced by the generator-resistance combination of Fig. 2a can be shown to be identical with a voltage generated by the circuit configuration of Fig. 2b. To support this identity, specific relative values for generators 12 and 13 and for resistance network elements $R_1$, $R_2$ and $R_3$ must be assumed. In these specific values, the voltage generated by 12 will be:

$$E_1=E\sin\omega t \quad (3)$$

by generator 13:

$$E_2=E\cos\omega t \quad (4)$$

In these equations, $\omega=2\pi f$ and $f$ is equal to the sinusoidal frequency of the generator 10 of Fig.

2*a*. An expression for the voltage G between terminals 15*a* and 15*b* will be found by the principle of superposition to be:

$$V=\frac{E_1R_3R_2+E_2R_3R_1}{R_1R_2+R_1R_3+R_2R_3} \quad (5)$$

Figure 2B:
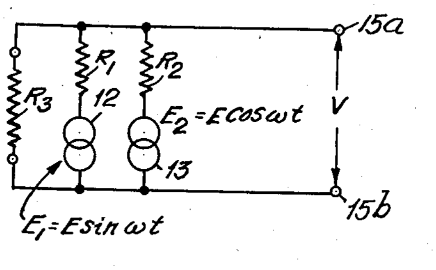

If the circuits of Figs. 2*a* and 2*b* are to be electrically identical, the terminals 15*a* and 15*b* must be presented a resistance equal to the value of the resistance 11 in the circuit of Fig. 2*a*. If resistance 11 is equal to R, and inasmuch as $R_1$, $R_2$ and $R_3$ are in parallel, the following equation must be satisfield:

$$\frac{1}{R}=\frac{1}{R_1}+\frac{1}{R_2}+\frac{1}{R_3} \quad (6)$$

The following expressions may be assumed for $R_1$, $R_2$ and $R_3$:

$$R_1=\frac{\sqrt{2}\,R}{\cos\theta} \quad (7)$$

$$R_2=\frac{\sqrt{2}\,R}{\sin\theta} \quad (8)$$

$$R_3=\frac{2R}{2-\sqrt{2}\,(\sin\theta+\cos\theta} \quad (9)$$

By substituting for $R_1$, $R_2$, $R_3$ and $E_1$ and $E_2$ in Equation 5:

$$E=\frac{\frac{2R}{2-\sqrt{2}\,(\sin\theta+\cos\theta}\left[E\,\frac{\sqrt{2}\,R}{\sin\theta}\sin\omega t+E\,\frac{\sqrt{2}\,R}{\cos\theta}\cos\omega t\right]}{\frac{2R^2}{\sin\theta\cos\theta}+\frac{2\sqrt{2}\,R^2}{2\cos\theta-\sqrt{2}\cos\theta(\sin\theta+\cos\theta)}+\frac{2\sqrt{2}\,R^2}{2\sin\theta-\sqrt{2}\sin\theta(\sin\theta+\cos\theta)}} \quad (10)$$

Reducing this expression:

$$V=\frac{\left[E\,\frac{\sqrt{2}}{\sin\theta}\sin\omega t+E\,\frac{\sqrt{2}}{\cos\theta}\cos\omega t\right]}{\frac{2-\sqrt{2}\,(\sin\theta+\cos\theta)}{\sin\theta\cos\theta}+\frac{\sqrt{2}}{\cos\theta}+\frac{\sqrt{2}}{\sin\theta}} \quad (11)$$

$$=1/2\sqrt{2}\,E[\cos 0\sin\omega t+\sin 0\cos\omega t]$$

$$V=1/2\sqrt{2}\,E\sin(\omega t+\theta$$

It will be noted that the ultimate expression for V (Equation 11) is comparable to the empirical form of the expression for V and to Equations 1 and 2 for voltage E' and E''.

It follows logically that by properly proportioning the value of network elements $R_1$, $R_2$, and $R_3$ according to Equations 7, 8, and 9, and by a judicious choice of generator voltages $E_1$ and $E_2$, the phase angle $\theta$ may be caused to assume any value between 0 and $2\pi$ radians.

Figure 1C:
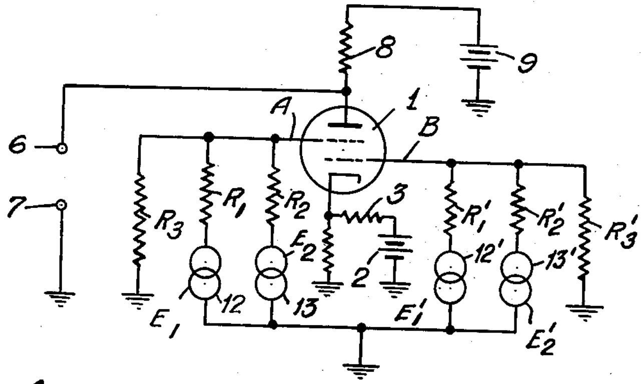

Referring to Fig. 1*c*, the equivalent circuit of Fig. 2*b* is shown as substituted in the control grid circuits of the distributor tube 1. The effect of generators 12, 13 and 12', 13', acting through network elements $R_1$, $R_2$, $R_3$ and $R_1'$, $R_2'$, $R_3'$, is the same as the action derived by the generator-resistance combination 4*a*, 5*a* and 4*b*, and 5*b* of the circuit of Fig. 1*a*. By the inclusion of the circuit of Fig. 2*b*, however, the phase angle $\theta$, of the voltage supplied to either of the control grids 2 or 3 of the tube 1 may be varied. As indicated by the above equations, varying the parameters of the generator voltages $E_1$, $E_2$ and $E_1'$, $E_2'$, as well as $R_1$, $R_2$, $R_3$ and $R_1'$, $R_2'$ and $R_3'$ allows a selection of the phase angle $\theta_a$ and $\theta_b$. Consequently, the conducting time of tube 1 may be selected to occur for any given period of time and at any point in the phase displacement cycle of the basic angular velocity, $\omega$.

By providing a multiplicity of distributor tubes, such as 1, and driving them with appropriate control voltages through the proper network elements, the conduction cycle of the distributor tubes may be discretely controlled. The distributor tube current flow, thus controlled, may be utilized to provide output pulses of voltage to control auxiliary switching or "gate" circuits. With such circuits, the pulses may be utilized to cause conduction or non-conduction of a separate switching circuit. A plurality of distributor tubes plus associated gate circuits can be made to provide segmented and cyclically repetitive switching, akin in result to a mechanical distributor. An example of such a distributor switching circuit will later be described.

Figures 3, 4A, 4B, 4C:
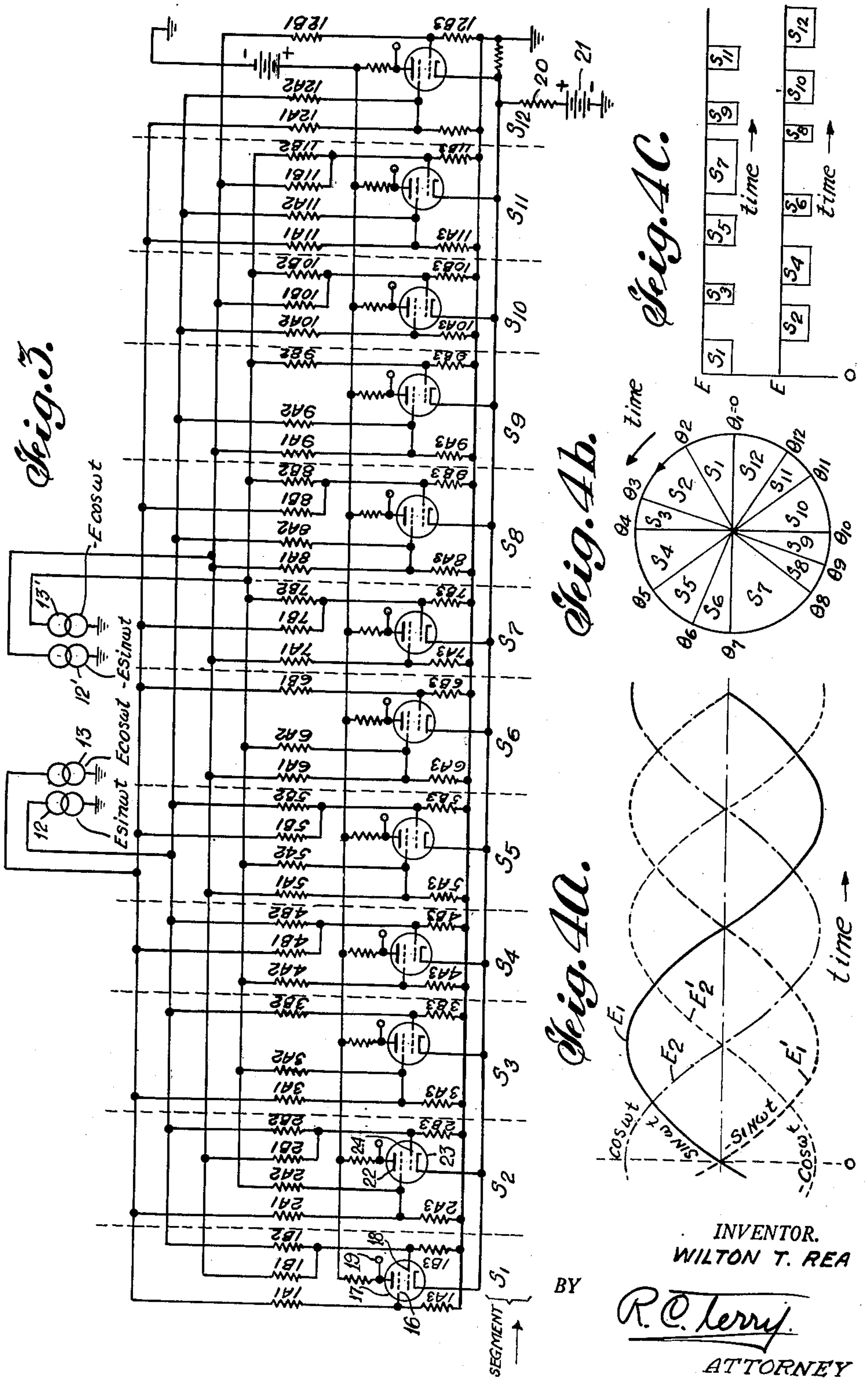
Fig. 3 shows a schematic circuit diagram of a switching distributor in accordance with the invention.
Figs. 4a, 4b and 4c are timing and wave form diagrams to aid in the explanation of the circuit shown in Fig. 3.

A plurality of distributor tube circuits of the type shown in Fig. 1c is to be seen in Fig. 3. In this figure a group of twelve distributor tubes is utilized. It may be assumed that each of the twelve distributor tubes will cooperate with other circuits to act as a distributor having twelve segments.

In order that the energizing network associated with any one distributing segment may be analyzed, the reference numerals of the network elements associated with each of the various segments bear: first, a number indicating to which segment the network element is connected; second, a letter A or B designating arbitrarily that the network element is associated with one of the two grids of the distributor tubes of that segment; and a second number, either 1, 2 or 3, correlating the network element to the correspondingly numbered subscript of the analogous network element in the circuit of Fig. 1c. Thus, if 3 is the second number in the reference numeral of the network element, this element is analogous to $R_3$ of Fig. 1c. For example, in Fig. 3, network element 5B1 indicates that the network element is in the fifth segment, connected to the B grid of this segment, and that it is analogous to element $R_1$ in the circuit of Fig. 1c.

Each of the distributor segments may utilize four voltage sources. These voltage sources are numbered 12, 13, 12' and 13', as they correspond to the similarly numbered sources in Fig. 1c. The four voltages can be defined by the expressions:

$E_1=E\sin\omega t$
$E_2=E\cos\omega t$
$E_1'=-E\sin\omega t$
$E_2'=-E\cos\omega t$ In the distributor of Fig. 3, it will be assumed that one cycle of distributor operation is equivalent to one cycle, $f$, of the frequency of these voltages. As the $\omega$ term of each of the voltages generated by 12, 13 and 12' and 13' is the same, the frequency $f$ (equal to $$\frac{\omega}{2\pi})$$

of each will be the same.

The voltages supplied from each of the four sources for one representative cycle have been plotted in Fig. 4*a*. The voltage derived from voltage source 12, $E_1$, may be assumed to be a sine wave having a node at time =0. Similarly, generator 13 will produce $E_2$, a cosine wave having a loop at time=0. Voltage source 12' delivers a voltage $E_1'$, $\pi$ radians out of phase from 12; voltage source 13' produces an output voltage $E_2'$, $\pi$ radians out of phase from $E_2$.

One object of the distributor of Fig. 3 is to provide a group of voltage pulses. As stated, these voltage pulses may, in turn, be used to energize switching circuits. To this extent, the voltage pulses and the circuits which generate them may be considered as "segments" in a distributor cycle.

For the purpose of illustration, arbitrary segment widths and segment phase occurrences have been chosen. It will be obvious to anyone skilled in the art that the segment widths or occurrences chosen are not necessarily controlling, but may be varied by the proper manipulation of the network elements and voltages. In addition, the segments of the distributor are shown to be immediately interjacent. This arrangement, similarly, is not necessary and it is utilized solely for the purpose of simplicity of illustration. In this regard, it is possible to provide time spaces between successive segments or to overlap one or more successive segments, providing for a plurality of operative segments at any given instant in the distributor cycle.

The arbitrary segmentation of the distributor cycle is shown in Fig. 4*b*. It is assumed that at the start of the first segment, $S_1$, the phase angle of the control voltage $\theta_1$ is at 0 radians. As the source voltage frequency, *f*, is assumed here to be the same as the distributor cycle frequency, the distributor cycle is also at 0 radians. The end of segment $S_1$ occurs at $\theta_2$. By the same token, the second segment starts immediately at the end of the preceding segment at $\theta_2$ and continues to $\theta_3$. The segmentation of the distributor will continue thus, through segments $S_3$ through $S_{12}$ for every given distributor cycle. It is to be noted that the various segments are selected to be of random time width, but such selection is not necessary and the segments may be equal.

In conformance with the circuit analysis previously presented with regard to Figs. 1*a* and 1*c*, appropriate values of network elements comparable to $R_1$, $R_2$ and $R_3$ of Fig. 1*c* must be chosen to provide the desired segment phase angles $\theta$. Similarly, the proper generator voltages 12, 13, 12' and 13' must be selected to pass through these network elements to one or the other grid of the various distributor tubes.

Four of the segment phase angles, $\theta_1$, $\theta_4$, $\theta_7$ and $\theta_{10}$, have arbitrarily been chosen to fall on the quadrantal points 0, $$\frac{\pi}{2}$$

$\pi$ and $2\pi$ radians, respectively. At these quadrantal points, both the sine of $\theta$ or the cosine of $\theta$ will be equal either to 1 or to 0. Thus, where $\theta$ is equal to 0, the sine is equal to 0; the cosine to 1. At $$\frac{\pi}{2}$$

radians, the sine of $\theta$ equals 1, the cosine of $\theta$ equals 0. At the quadrantal points, the expressions controlling the value of $R_1$ or $R_2$, as found in Equations 7 and 8, will have a denominator equal either to 1 or to 0. In those cases where the denominator is equal to 0, the value of the resistance is infinite, corresponding to an open circuit, and the network element thus evaluated need not be included in the circuit. Thus, in segment 1, the network element 1A1 will be equal to the specific value $\sqrt{2}R$, as the cosine of 0 radians=1. There is shown no network element which would ordinarily bear the number 1A2 (analogous to $R_2$). It is to be remembered that according to Equation 8, $R_2$ is equal to $$\frac{\sqrt{2}\,R}{\sin\,\theta_1}$$

As the sine of $\theta_1$ is equal to 0 at 0 radians, the resistance value for $R_2$ will be infinite, and the corresponding circuit element 1A2 will disappear. It is obvious that if segment starts and stops are not made at the quadrantal points, the expressions for $R_1$ and $R_2$ will be finite and network elements corresponding must be provided therefor.

The network elements of each of the distributor tubes must be evaluated in accordance with the phase angle of the stopping or starting points of the associated segment. In addition, the proper voltage to be supplied to each of the network elements may also be ascertained. To provide a more comprehensive understanding of the distributor circuit of Fig. 3, Table I, as follows, indicates computed parameters of the distributor circuits for each of the 12 segments arbitrarily chosen:

*Table I*

| Segment | Network Element Reference No. | Network Element Magnitude | Network Element Applied Voltage |
|---|---|---|---|
| 1 | 1A1 | $\sqrt{2}\ R$ | $E \sin \omega t$ |
| | 1A3 | $(2+\sqrt{2})R$ | |
| | 1B1 | $\frac{\sqrt{2}\ R'}{\cos\ \theta_2}$ | $-E \sin \omega t$ |
| | 1B2 | $\frac{\sqrt{2}\ R'}{\sin\ \theta_2}$ | $E \cos \omega t$ |
| | 1B3 | $\frac{2R'}{2-\sqrt{2}(\sin\theta_2+\cos\theta_2)}$ | |
| 2 | 2A1 | $\frac{\sqrt{2}R}{\cos\ \theta_2}$ | $E \sin \omega t$ |
| | 2A2 | $\frac{\sqrt{2}R}{\sin\ \theta_2}$ | $-E \cos \omega t$ |
| | 2A3 | $\frac{2R'}{2-\sqrt{2}(\sin\theta_2+\cos\theta_2)}$ | |
| | 2B1 | $\frac{\sqrt{2}R'}{\cos\ \theta_2}$ | $-E \sin \omega t$ |
| | 2B2 | $\frac{\sqrt{2}R'}{\sin\ \theta_3}$ | $E \cos \omega t$ |
| | 2B3 | $\frac{2R}{2-\sqrt{2}(\sin\theta_3+\cos\theta_3)}$ | |
| 3 | 3A1 | $\frac{\sqrt{2}R}{\cos\ \theta_3}$ | $E \sin \omega t$ |
| | 3A2 | $\frac{\sqrt{2}R}{\sin\ \theta_3}$ | $-E \cos \omega t$ |
| | 3A3 | $\frac{2R}{2-\sqrt{2}(\sin\theta_3+\cos\theta_3)}$ | |
| | 3B2 | $\sqrt{2}R'$ | $E \cos \omega t$ |
| | 3B3 | $(2+\sqrt{2})R'$ | |

*Table I*—Continued

| Segment | Network Element Reference No. | Network Element Magnitude | Network Element Applied Voltage |
|---|---|---|---|
| 4 | 4A2 | $\sqrt{2}R$ | $-E\cos\omega t$ |
| | 4A3 | $(2+\sqrt{2})R$ | |
| | 4B1 | $\frac{\sqrt{2}R'}{-\cos\theta_5}$ | $E\sin\omega t$ |
| | 4B2 | $\frac{\sqrt{2}R'}{\sin\theta_5}$ | $E\cos\omega t$ |
| | 4B3 | $\frac{2R'}{2-\sqrt{2}(\sin\theta_5-\cos\theta_5)}$ | |
| 5 | 5A1 | $\frac{\sqrt{2}R}{-\cos\theta_5}$ | $-E\sin\omega t$ |
| | 5A2 | $\frac{\sqrt{2}R}{\sin\theta_5}$ | $-E\cos\omega t$ |
| | 5A3 | $\frac{2R}{2-\sqrt{2}(\sin\theta_5-\cos\theta_5)}$ | |
| | 5B1 | $\frac{\sqrt{2}R}{-\cos\theta_6}$ | $E\sin\omega t$ |
| | 5B2 | $\frac{\sqrt{2}R'}{\sin\theta_6}$ | $E\cos\omega t$ |
| | 5B3 | $\frac{2R}{2-\sqrt{2}(\sin\theta_6-\cos\theta_6)}$ | |
| 6 | 6A1 | $\frac{\sqrt{2}R}{-\cos\theta_6}$ | $-E\sin\omega t$ |
| | 6A2 | $\frac{\sqrt{2}R}{\sin\theta_6}$ | $-E\cos\omega t$ |
| | 6A3 | $\frac{2R}{2-\sqrt{2}(\sin\theta_6-\cos\theta_6)}$ | |
| | 6B1 | $\sqrt{2}R'$ | $E\sin\omega t$ |
| | 6B3 | $(2+\sqrt{2})R'$ | |
| 7 | 7A1 | $\sqrt{2}R$ | $-E\sin\omega t$ |
| | 7A3 | $(2+\sqrt{2})R$ | |
| | 7B1 | $\frac{\sqrt{2}R'}{-\cos\theta_8}$ | $E\sin\omega t$ |
| | 7B2 | $\frac{\sqrt{2}R'}{-\sin\theta_8}$ | $-E\cos\omega t$ |
| | 7B3 | $\frac{2R'}{2+\sqrt{2}(\sin\theta_8+\cos\theta_8)}$ | |
| 8 | 8A1 | $\frac{\sqrt{2}R}{-\cos\theta_8}$ | $-E\sin\omega t$ |
| | 8A2 | $\frac{\sqrt{2}R}{-\sin\theta_8}$ | $E\cos\omega t$ |
| | 8A3 | $\frac{2R}{2+\sqrt{2}(\sin\theta_8+\cos\theta_8)}$ | |
| | 8B1 | $\frac{\sqrt{2}R'}{-\cos\theta_9}$ | $E\sin\omega t$ |
| | 8B2 | $\frac{\sqrt{2}R'}{-\sin\theta_9}$ | $-E\cos\omega t$ |
| | 8B3 | $\frac{2R'}{2+\sqrt{2}(\sin\theta_9+\cos\theta_9)}$ | |

*Table I*—Continued

| Segment | Network Element Reference No. | Network Element Magnitude | Network Element Applied Voltage |
|---|---|---|---|
| 9 | 9A1 | $\frac{\sqrt{2}R}{-\cos\theta_9}$ | $-E\sin\omega t$ |
| | 9A2 | $\frac{\sqrt{2}R}{-\sin\theta_9}$ | $E\cos\omega t$ |
| | 9A3 | $\frac{2R}{2+\sqrt{2}(\sin\theta_9+\cos\theta_9)}$ | |
| | 9B2 | $\sqrt{2}R'$ | $-E\cos\omega t$ |
| | 9B3 | $(2+\sqrt{2})R'$ | |
| 10 | 10A2 | $\sqrt{2}R$ | $E\cos\omega t$ |
| | 10A3 | $(2+\sqrt{2})R$ | |
| | 10B1 | $\frac{\sqrt{2}R'}{\cos\theta_{11}}$ | $-E\sin\omega t$ |
| | 10B2 | $\frac{\sqrt{2}R'}{-\sin\theta_{11}}$ | $-E\cos\omega t$ |
| | 10B3 | $\frac{2R'}{2+\sqrt{2}(\sin\theta_{11}-\cos\theta_{11})}$ | |
| 11 | 11A1 | $\frac{\sqrt{2}R}{\cos\theta_{11}}$ | $E\sin\omega t$ |
| | 11A2 | $\frac{\sqrt{2}R}{-\sin\theta_{11}}$ | $E\cos\omega t$ |
| | 11A3 | $\frac{2R}{2+\sqrt{2}(\sin\theta_{11}-\cos\theta_{11})}$ | |
| | 11B1 | $\frac{\sqrt{2}R}{\cos\theta_{12}}$ | $-E\sin\omega t$ |
| | 11B2 | $\frac{\sqrt{2}R'}{-\sin\theta_{12}}$ | $-E\cos\omega t$ |
| | 11B3 | $\frac{2R'}{2+\sqrt{2}(\sin\theta_{12}-\cos\theta_{12})}$ | |
| 12 | 12A1 | $\frac{\sqrt{2}R}{\cos\theta_{12}}$ | $E\sin\omega t$ |
| | 12A2 | $\frac{\sqrt{2}R}{-\sin\theta_{12}}$ | $E\cos\omega t$ |
| | 12A3 | $\frac{2R}{2+\sqrt{2}(\sin\theta_{12}-\cos\theta_{12})}$ | |
| | 12B1 | $\sqrt{2}R'$ | $-E\sin\omega t$ |
| | 12B3 | $(2+\sqrt{2})R'$ | |

In the foregoing table, the value of $\theta$ to be substituted in the equations for calculating the magnitude of the network will be the phase angle of $\theta$ at the stop or the start of the segment to be calculated. Thus, $\theta_5$ is an angle lying both at the end of the fourth segment, $S_4$, and at the beginning of the fifth segment, $S_5$, as shown in Fig. 4b. The value of R is the equivalent resistance of the network $R_1$, $R_2$ and $R_3$ as calculated by Equation 6. In the table, R refers to the network associated with the "A" grid of the distributor tube under consideration. Resistance R', similarly arrived at, refers to the network associated with the other or "B" side of the distributor tube.

With regard to the operation of the distributor of Fig. 3, the first segment, $S_1$, is typical. The voltage applied to the grid 16 of the first segment distributor tube will cause this particular tube 17 to conduct at the point $\theta_1$, which may be seen in Fig. 4*b*. Arbitrarily, $\theta_1$ is chosen to occur at the start of the distributor cycle, where it may be assumed that time, *t*, is equal to 0. When, at some period of time later, the distributor cycle will have reached a point equivalent to phase angle $\theta_2$, the first segment, $S_1$, will be complete. At this instant, the voltage applied to the grid 18 will cause the distributor tube 17 to stop conducting. Measurement of the voltage between terminal 19 and ground will indicate first a negative transition, then a positive transition of voltage as tube 17 becomes conducting and then non-conducting. As stated, these transitions can be arranged to provide a substantially square wave shape with the proper selection of cathode resistance 20 and cathode bias source 21.

At the same instant that the segment $S_1$ is completed, a voltage is supplied to the grid 22 of the tube 23 of the succeeding segment $S_2$. At the time that the distributor reaches a point in its cycle corresponding to a phase angle $\theta_2$, voltages are applied both to grids 22 and 24 which cause tube 23 to conduct. Conduction of tube 23 continues over segment $S_2$ until a point in the distributor cycle corresponding to the phase angle $\theta_3$ has been reached; at this time, tube 23 becomes non-conducting.

The distributor tubes of each of the succeeding segments $S_3$ through $S_{12}$ will, in turn, conduct. In Fig. 4*c* there is shown a graphical representation of the anode voltages of the distributor tubes, plotted as a function of time, and labeled in accordance with the segmentation previously assumed. For the sake of clarity, the segments bearing even-numbered subscripts have been shown on separate axes from the odd ones. This choice of representation is arbitrary, and the reference ordinate of anode voltage may be the same in each case. In Fig. 4*c*, as the distributor passes from one segment to another, a depression of voltage from the reference ordinate will occur, and this depression may be made substantially a square wave in shape.

The distributor segments will have a width or time value equivalent to the arbitrary choice made for the various phase angles $\theta$. For example, the segment $S_7$ in Fig. 4*c* will be proportionately wider than the segment $S_3$, depending upon the phase angle difference between $\theta_7$—$\theta_8$ and $\theta_3$—$\theta_4$.

*Telegraph system*

The distributor circuit according to the invention may be modified and applied to systems of telegraphic communication and will be described with reference to such a system. Although described with reference to a telegraph system, it is to be understood that the distributor circuit and the modification shown are not limited to telegraph circuits, but are applicable to time division transmission and telemetering systems generally.

In "start-stop" telegraphic systems, the transmitters are frequently operated by perforated tape. At the source of the desired intelligence, an operator causes the tape to be perforated in groups representing the letters or symbols to be transmitted. A corresponding group of sensing pins, associated with a "tape sensing mechanism," determines the number and arrangement of the perforations representing a given letter or symbol. In the prior art, information received by the sensing pins, i. e., whether a perforated or non-perforated part of the tape is sensed, was sampled discretely by a mechanical distributor system associated with the transmitted equipment. The intelligence found on the relative sensing pins was analyzed by the transmitting distributor with respect to time. In addition, the distributor ordinarily transmits a signal element which is used to synchronize the transmitting and receiving equipment. This system is, of itself, well known and described in United States Patent No. 2,055,567 to Watson, granted September 29, 1936. There, in brief, the desired intelligence is mechanically scanned and then caused to be transmitted in the form of electrical impulses, over a transmission line, to a receiver. The receiver, remotely located, can analyze the received impulses through the provision of a synchronized mechanical distributor. The synchronized distributor includes a "selector" magnet energized in accordance with the received impulses, resulting in a derivation at the receiver of the originally transmitted intelligence.

Electrical impulses produced as a result of the sensing of the perforated tape are known in the telegraphic art by the terms "marking" and "spacing." Two contrasting conditions of the line are indicated by these words. In some telegraphic systems, perforation is made to alter or reverse the flow of current in the transmitter medium or line. In systems employing a reversal of current flow, the line may be said to be in a "marking" condition when current flow is established in a given direction, and in a "spacing" condition when current flow is in the opposite direction. Thus, for a given marking condition, one transmission line will appear to be positive with respect to the other negative transmission line; in the spacing condition, these polarities will be reversed. A system of this type is known as a polarized system. It will be understood that in other types of systems, the terms "marking" and "spacing" may have somewhat different meanings.

In the telegraphic transmitting arrangement, according to the present invention, each cycle of distributor rotation will transmit a group of five "intelligence-bearing" signal elements. For each cycle of distributor operation, these five signal elements will represent the intelligence contained in a particular code group or letter to be transmitted. Synchronizing information essential to maintain transmitting and receiving equipment in proper relative operation requires the addition of "synchronizing" signals. These synchronizing signals comprise a "start" signal and a "stop" signal, and these mark the beginning and end of each cycle of distributor rotation.

Figure 5A:
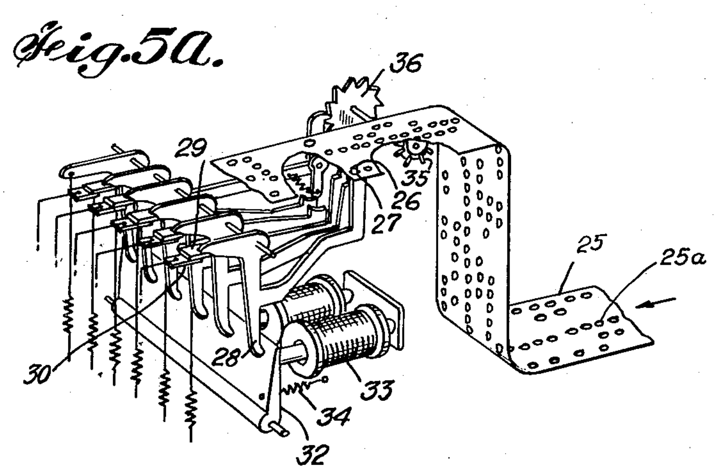
Fig. 5a shows a telegraphic tape sensing mechanism which may be used in conjunction with the telegraphic system according to the invention.

Referring now to Fig. 5*a*, there is shown a tape-sensing mechanism of a known type, which utilizes a perforated tape 25. Tape 25 may, for example, be one prepared by a keyboard perforator of the type shown in Patent 1,965,602, granted July 10, 1934, to R. A. Lake or a reperforator of the type indicated in Patent 1,884,743, granted October 25, 1932, to E. E. Kleinschmidt. The relative positions of perforated and unperforated portions along a given line transversely of the tape travel will provide various code combinations. As shown, by way of example, a sensing pin 26 is received by a hole in the tape 27. The armature 28 and the contact 29 carried by it are controlled in position by the sensing pin and will vary in accordance with the perforated or unperforated tape condition which the sensing pin may encounter. In result, the contact 29 will make either with a lower contact 30 or with an upper contact 31, depending upon whether the sensing pin reads a perforated or unperforated portion of the tape. The upper contact 31, not shown in Fig. 5a for clarity, may be seen in the detailed view Fig. 5b. It may be assumed, for illustrative purposes, that a "marking" condition is established when contact 29 makes with contact 30; a spacing condition when contact 29 makes with contact 31.

When a group of perforations have been read by the various sensing pins, the intelligence thereon scanned in a manner later described, the bail 32 may be rotated through a short arc in a counter-clockwise direction by the step magnet 33, which overcomes spring 34. This movement of the bail 32 will act upon the bell crank section of armature 28; each of the sensing pins, as 26, will thereupon be withdrawn from the tape perforations. Tape 25 is provided with a series of feed holes, for example, 25a, which are arranged on the tape along a line in the direction of tape travel. These tape feed holes are engaged by a tooth sprocket 35 which is, in turn, controlled by escapement mechanism 36. The sprocket 35 advances the perforated tape a distance of one perforation group each time the escapement 36 advances. Counter-clockwise movement of the bail 32, caused by energization of the step magnet 33, is utilized to move the escapement 36, simultaneously with the withdrawal of the sensing pins. Energizations of the energizing magnet 33 will at once withdraw the various sensing pins and advance the perforated tape, thus allowing a reading of the succeeding perforation group.

It may be seen that, dependent upon which of the five sensing pins shown read perforations in the tape, a group of contacts, of which 29 is representative, make either with an associated lower contact, as 30, or an upper contact, as 31. These alternative conditions represent either a marking or a spacing signal to be transmitted to the line, and comprise the intelligence to be found by reading a perforation group of the tape.

In addition to the intelligence signals derived in the manner described, there must also be transmitted, in association therewith, appropriately chosen synchronizing signals. In telegraphic communication equipment of the type described, the periods between readings of successive perforation groups are utilized to transmit "stop" and "start" synchronizing signals. The start signal occurs immediately before the reading of each perforation group and is here chosen arbitrarily as a spacing signal. The stop signal, transmitted at the conclusion of each perforation group, is here assumed to be a marking signal. The spacing and marking signals, representative of the start and stop conditions at the transmitter, are utilized by the receiver to synchronize the distributor circuit of the latter with that of the transmitter.

*Transmitter oscillator*

The circuits and networks described with reference to the distributor shown in Fig. 3 are applicable, with some modification, to telegraph transmitters operating in a system as described above.

Figure 6:
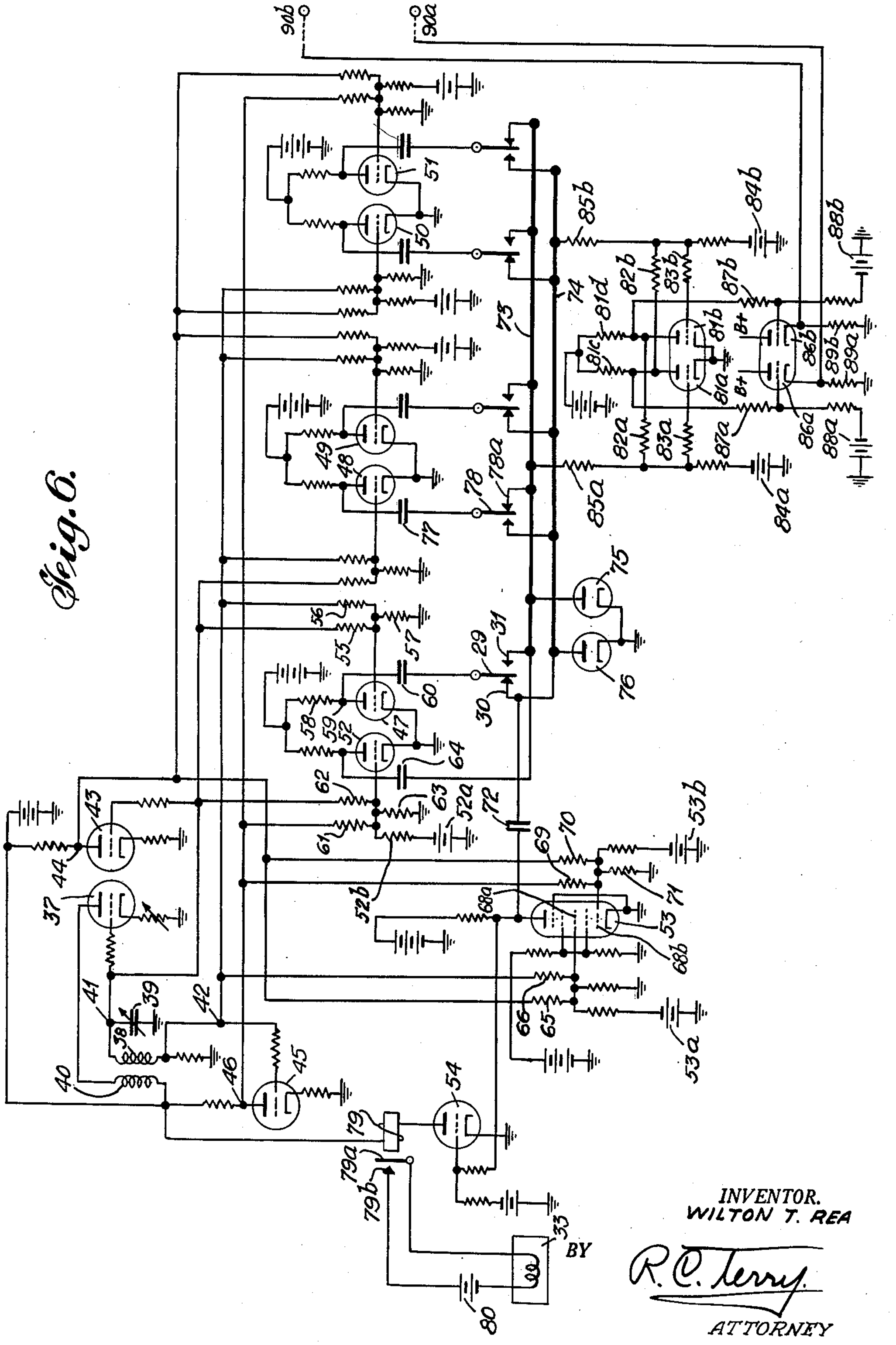
Fig. 6 shows a schematic circuit diagram of a telegraph transmitter according to the invention.

As in the case of the distributor of Fig. 3, in the telegraph transmitter shown in Fig. 6, a group of four voltages bearing the general relationship of sin $\omega t$, cos $\omega t$, $-$sin $\omega t$, and $-$cos $\omega t$ are generated. Several means may be employed to generate such related voltages; a suitable circuit employing triodes 37, 43 and 45 is shown in Fig. 6.

An oscillator of the "tickler feedback" or "tuned grid" type employs triode 37. A tuned circuit composed of an inductance 38 and a capacitance 39 is connected in the grid-cathode circuit of the oscillator triode 37. The anode-cathode circuit of 37 includes a tickler coil 40 inductively coupled to the inductance 38. In this known type of oscillator, oscillations are sustained by the positive feedback induced from the anode circuit coil 40 to the grid circuit inductance 38. The frequency at which the oscillator resonates depends, inter alia, upon the value of inductance and capacitance selected for elements 38 and 39, respectively, as these elements form a parallel tuned circuit controlling the oscillator. The tuned circuit determines the frequency, $f$, of the distributors by controlling the term $\omega t$ in the oscillator voltages applied to the distributor tubes. At any instant, the voltage developed across the inductance 38 will be displaced $$\frac{\pi}{2}$$

radians by the inductive characteristic of 38. If the voltage supplied at point 41 is thus assumed to be a sine wave of frequency $f$, the voltage at point 42 will lead the point 41 by $$\frac{\pi}{2}$$

radians to give a cosine wave of frequency $f$. The alternating voltage at point 41 may be said to be equal to E sin $\omega t$.

The sine wave developed at 41 is supplied to the grid-cathode circuit of inverter triode 43. The inverter 43 is utilized solely to provide an output having a phase shift of $\pi$ radians with respect to the sin $\omega t$ voltage at 41. The inherent action of an amplifier as 43 will be to provide this phase shift; as voltage increases in a more positive direction in the grid-cathode circuit of tube 43, the anode current, and consequently the anode-cathode voltage, will decrease. Conversely, a voltage less positive in the grid-cathode circuit will cause the anode-cathode voltage to rise. As a result, a voltage displaced $\pi$ radians from E sin $\omega t$ will result at point 44, the voltage thereon having alternating component $-$E sin $\omega t$, and a direct-current component resulting from residual direct anode supply voltage. The direct voltage component may be neutralized in use.

Point 42, as previously explained, will have an alternating voltage which may be represented as E cos $\omega t$. A portion of the cosine voltage at 42 is supplied to the grid-cathode current circuit of a second inverter tube, 45. As with inverter tube 43, a phase displacement of $\pi$ radians from the grid-cathode voltage will be experienced by the anode-cathode voltage thereof. A voltage results at point 46, having an alternating magnitude $-$E cos $\omega t$, together with a direct-current component of anode voltage.

Four alteranting voltages, bearing the originally stated phase of trigonometric relationship will be provided at points 41, 42, 44 and 46.

*Transmitting distributor*

Figure 5B:
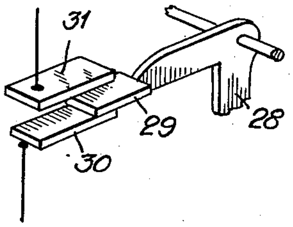
Figure 8:
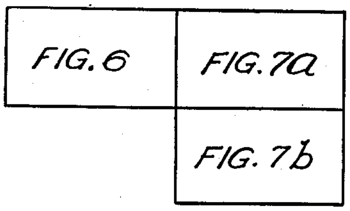
Fig. 8 shows the interrelation of Figs. 6, 7a and 7b.

In the transmitting distributor, a ring, shown in Fig. 6, of five vacuum tubes, 47, 48, 49, 50 and 51, cooperate with corresponding tape sensing armature contacts such as 29 in Fig. 5a and Fig. 5b. These five distributor tubes will provide discrete and successive pulses to the armature contacts 29. These, in turn, will connect the distributor pulse to either the marking or spacing contact cooperating therewith, depending upon the intelligence to be read in the perforation groups of the tape 25. These distributor tubes 47—51 control the time division of the intelligence signals. The synchronizing or start-stop signals are cared for by a start tube 52 and a stop tube 53. The multigrid stop tube 53, in addition to providing a stop signal, influences a control triode 54 which, in turn, provides operation of a later-described step magnet 33 (Figs. 5a and 6).

Returning to the intelligence distributing tubes 47 to 51, the operation of triode distributor tube 47 is typical. As in the case of the tetrode in Fig. 1c, two oscillator voltages are supplied to the grid-cathode circuit of triode 47 through a network comprising resistances 55, 56 and 57. Resistances 55, 56 and 57 correspond to resistances $R_1$, $R_2$, and $R_3$ of Fig. 1e. The triode 47 has only one grid, however; its conduction period will be thus caused to occur over the entire positive excursion of the grid-cathode voltage. The effect of such a single grid control may be seen in Fig. 1b, for example, the sector of $\pi$ radians comprising the vertical sectioned area starting at phase angle $\theta_a$.

The point in time, with reference to the distributor cycle, at which the triode 47 starts its conduction cycle, will be determined by the magnitude of resistances 55, 56, 57 and the alternating voltages supplied to the resistances 55 and 56. As resistance 55 is connected to point 41, there is supplied thereto a voltage having a magnitude $E \sin \omega t$. The resistance 56 is similarly supplied from point 42 with a voltage $E \cos \omega t$. By virtue of the network and voltages selected to supply the grid of 47, a conduction cycle starting at a given phase angle will occur. Conduction of triode 47 is reflected as a voltage drop in its anode-cathode circuit; the increased anode current flow through resistance 58 causes an increased voltage drop across the latter, depressing the voltage at point 59. The transient change in the voltage at point 59, resulting from the change from the conducting to the non-conducting condition, will be applied through capacitance 60 to armature contact 29.

Contact 29, it will be remembered, is shown in Figs. 5a and 5b as controlled in position by the perforations in the tape 25. Depending upon whether the armature 28 and its cooperating sensing pin 26 read either a perforated or an unperforated portion of the tape, the armature 29 will be made either to contact 30 or contact 31. As shown in Figs. 5a and 5b, the sensing pin reads a perforation 27; as a result, contact 29 makes with contact 30. The same situation is displayed with regard to the remaining analogous contacts, as 78, in Fig. 6.

Each of the remaining distributor tubes covering the intelligence portion of the distributor cycle, i. e., 48—51, will operate sequentially and in the same manner as did triode 47. In each case, the associated resistance network comparable to 55, 56 and 57 or $R_1$, $R_2$, and $R_3$ will have values chosen which, together with the voltages supplied from two of the four voltage source points 41, 42, 44 and 46, will cause the respective triodes to provide a conducting cycle of substantially $\pi$ radians. The conducting cycle will commence at a phase angle dependent upon the parameters of the resistance network and voltages selected. The various distributor tubes will supply sequential pulses of voltages to cooperating sensing armature contacts. These voltage pulses alternatively reach either one of two buses, 73 or 74. It will be shown that when a negative pulse is received on bus 73, a spacing condition will be established on the transmission line between transmitter and receiver. When a negative pulse is received at bus 74, a marking condition will be established on the transmission line.

For the purpose of illustration, it has been assumed that the start synchronizing signal will reflect a spacing condition on the line. The spacing synchronizing signal, coming before the intelligence portions of the distributor cycle, is provided by triode 52. Triode 52 is provided with a conduction period starting at a phase angle $\theta$, dependent upon the network comprising resistances 61, 62 and 63 connected to voltage sources from points 41 and 46. As with triode 47, a negative pulse of voltage will be transmitted through capacitance 64 to the spacing bus 73, at the time that the anode-cathode circuit of triode 52 becomes conducting. This pulse will occur at some time before the conduction of the various intelligence segments of the distributor. The grid of distributor tube 52 is supplied from points 41 and 46. As previously indicated, point 46 will have a residual direct-current component resulting from the anode supply voltage. To overcome this unwanted direct-current component, a negative bias source 52a, acting through resistance 52b, is provided, and the component will be eliminated.

At the end of the intelligence segments of the distributor, a stop signal is produced by the multigrid tube 53. Differing, however, from the other distributor tubes 47—52, tube 53, having two control grids, is provided with controlled conducting and non-conducting segment points in the manner of the circuit of Fig. 1c. One control grid 68a is supplied with voltages from points 42 and 44 acting through a network comprising resistances 65, 66 and 67. Similarly, a second control grid 68b is supplied with voltages from points 44 and 46 through a network comprising resistances 69, 70 and 71. As a result, tube 53 has a conducting period, the beginning and end of which will be controlled by either of the two grids 68a and 68b and their associated networks and supply voltages as shown graphically in Fig. 1b. Negative bias sources 53a and 53b operate to eliminate the unwanted direct-current component of the voltages from points 44 and 46, respectively.

In generating the stop pulse, as tube 53 passes from the non-conducting to the conducting condition, a negative voltage pulse will be transmitted through the capacitance 72 to the marking bus 74.

For the purpose of illustration, one division of time between the various segments provided by distributor tubes 47—53 may be described. According to this illustration, the start distributor tube 52 may initiate conduction at the 0-degree point of the distributor cycle; distributor tube 47 may start conducting at 48½ degrees, tube 48 at 97 degrees, tube 49 at 145½ degrees, tube 50 at 194 degrees, and tube 51 at 242½ degrees; tube 53 may start conducting at 291 degrees and stop conducting at 360 degrees. At each of the points at which a tube conduction starts, there will be provided a negative pulse supplied through the cooperating capacitance. Although positive pulses result from the completion of the conducting cycle, the positive pulses are rejected.

In further examination of the distributor cycle, the negative pulse developed through the capacitance 64 by the start of conduction in tube 52 is supplied to the bus 73. This negative pulse on the spacing bus 73 signals the initiation of the distributor cycle, and is the start pulse. The positive pulse subsequently received through the capacitance 64 as a result of the cessation of the conducting of tube 52 travels to the anode of a rectifier 75 and thence down the space charge path to the cathode thereof and ground. Positive pulses on the bus 73 will all be dissipated in this manner.

As the next step in the distributor cycle, triode 47 becomes conducting at a given instant of time equivalent to the shift in phase angle $\theta$ provided by the resistance network 55, 56 and 57, and the voltages supplied from the points 41 and 42. It has been indicated that conduction of triode 47 may begin at a point 48½ degrees along in the distributor cycle. In any event, when triode 47 conducts, a negative pulse is transmitted through the capacitance 60 to the contact of the sensing armature 29. Dependent upon whether the contact 29 is made against contact 30 or 31, the negative pulse is further transmitted either to the marking bus 74 or the spacing bus 73, respectively. In the tape conditions indicated in Figs. 5*a* and 5*b*, as well as in Fig. 6, contact 29 is made with contact 30. As a result, the negative pulse from capacitance 60 is transmitted to the marking bus 74. The subsequent pulse developed at the end of the conducting period of the triode 47 will not affect the marking bus 74; all positive pulses thereon will be dissipated by the marking bus damping rectifier 76.

To continue in the distributor cycle, the triode distributor tube 48 starts conducting at some later time in the distributor cycle. The start of the conducting cycle of tube 48, which may be at 97 degrees in accordance with the value assumed for illustration, produces a negative pulse through the capacitance 77. This negative pulse reaches a tape sensing armature contact 78. Under the condition as shown, contact 78 reflects an unperforated condition of the tape and is made to contact 78*a*; the negative pulse will therefore be transmitted to the spacing bus 73.

Depending on the reading found on the tape, the subsequent conductive distributor triodes 49, 50 and 51 will provide negative pulses either to the spacing or marking buses 73 and 74. The positions for the armature contacts, as 29, are indicated arbitrarily for the purpose of illustration.

A stop signal coinciding with the initiation of conduction of distributor tube 53 is presented through capacitance 72 to the marking bus 74, providing a marking signal. This point, at which distributor tube 53 becomes conducting, may be assumed to be at 291 degrees. The positive pulse subsequently received from the end of conduction of the tube 53 is absorbed by marking bus damping rectifier 76.

The stop distributor tube 53 fulfills a second function in addition to providing the marking stop signal to the marking bus 74 as previously described. The pulse, occurring as a result of the transition from the non-conducting, to conducting, to non-conducting condition of the tube 53, is coincidentally transmitted to the grid-cathode circuit of control tube 54. At the time tube 53 passes from the non-conducting to the conducting condition, assumed to be at 291 degrees in the distributor cycle, the grid of control tube 54 becomes less positive. Until now, control tube 54 has been conducting but the depression of grid-cathode voltage causes tube 54 to become non-conducting. Relay 79 is operated by the anode current of tube 54. As the normal condition of tube 54 is conducting, the relay contacts are held open. The initiation of the conducting cycle of tube 53 interrupts the anode current of tube 54, and the relay 79 is deenergized. Upon the termination of conduction of tube 53, assumed to be at the 360-degree point in the distributor cycle, the grid-cathode voltage of control grid 54 will once again rise to its normal value, triode 54 again conducts and the relay 79 will be energized. Energization of relay 79 causes the armature 79*a* to be withdrawn from the associated contact 79*b*. Contacts 79*a* and 79*b*, in turn, open the circuit between a power source, 80, and the coil of step magnet 33. When relay 79 is deenergized, reflecting a non-conducting condition of control tube 54, power supply 80 energizes the step magnet 33, performing its previously described function of rotating the bail 32 in a counterclockwise direction as shown in Fig. 5*a*. The ensuing operations, such as the withdrawal of the sensing pins, such as 26, and the operation of the escapement mechanism 36 driving the tape feed sprocket 35 as described, will occur. At the completion of the conduction cycle of tube 53, control tube 54 will once again conduct, relay coil 79 will be energized, and the circuit of the step magnet 33 will again become deenergized, allowing the successive tape sensing and distributor cycle to begin.

*Transmitter gate circuits*

A series of five negative intelligence pulses have been shown to appear either on the spacing bus 73 or the marking bus 74, depending upon which of the five cooperating armature contacts read perforations or nonperforations in the intelligence of perforated tape 25. Two synchronizing signals also appear; a negative pulse on spacing bus 73 providing the start signal; a negative pulse on marking bus 74 providing the stop signal. The start, intelligence and stop pulses appear in sequential order on either of the appropriate spacing or marking buses.

These short negative signal impulses must be "filled in" or interpreted to provide a variously polarized output to a transmission line pair. To accomplish this, there is employed a multivibrator having two conditions of stability, commonly called a "flip-flop" circuit. This circuit utilizes triodes 81*a* and 81*b*. The energizing circuits of the triodes 81*a* and 81*b* are so arranged that if one of the two triodes is conducting, the other triode must be non-conducting. Assuming, for example, that triode 81*a* is conducting, the anode current flow resulting provides a depressed or less positive anode voltage. This less positive anode voltage is supplied through resistances 82*b* and 83*b* to the grid-cathode circuit of 81*b*.

The bias supply source 84*b* has a value together with the assumed less positive anode voltage transmitted to the grid of tube 81*b* that will bias the latter to cut-off. As tube 81*b* is cut off, the anode-cathode voltage of 81*b* is at its positive maximum; this positive maximum voltage is transmitted through resistance 82*a* and 83a to the grid-cathode circuit of triode 81a. The value of bias supply 84a is not sufficient to overcome this maximum positive voltage applied to the grid of 81a; 81a will, therefore, continue to conduct. It can be shown that if the conditions of stability are reversed, i. e., that 81b is conducting, 81a must become non-conducting, and this new condition will become similarly stable.

Alternate conditions of conduction are established between the triodes 81a and 81b by voltage pulses transmitted from the marking and spacing buses. Thus a negative pulse passes through resistance 85a from the spacing bus 73 to the grid of triode 81a; pulses are also transmitted from marking bus 74, through resistance 85b to the grid of triode 81b. Assuming first that triode 81a is conducting and triode 81b non-conducting, then if a negative pulse is received on the grid of 81a from the spacing bus 73, this pulse, when combined with the voltage of the bias source 84a against the positive voltage derived from the anode of 81b, will arrest conduction of triode 81a. When 81a stops conducting, the voltage drop across anode resistance 81c disappears and the anode-cathode voltage rises to a positive maximum. This increased positive voltage is transmitted through resistances 82b and 83b to the grid of triode 81b, overcoming the effect of the negative bias source 84b. The triode 81b will thereupon start conducting. As a result of the conducting condition in triode 81b, its anode-cathode voltage is depressed by the voltage drop across resistance 81d. The less positive voltage thus derived is transmitted over resistances 82a and 83a to the grid of triode 81a and combined with bias source 84a; triode 81a is maintained in non-conducting condition. Thus, even though the initial negative pulse received from the spacing bus 73 has decayed, the new condition of stability, wherein 81a is non-conducting and 81b is conducting, will be maintained until a new condition occurs on the marking bus.

When a condition of stability is reached resulting from a negative pulse on the spacing bus 73, subsequent negative pulses on the spacing bus 73 will no longer affect the grid of triode 81a. As triode 81a is non-conducting, negative pulses on the grid thereof can cause no change in operation; the flip-flop multivibrator will ignore negative pulses on the spacing bus. To change the condition of stability reached, there must be a negative pulse on the marking bus 74. A negative pulse on marking bus 74 reaches the grid of triode 81b through resistance 85b; triode 81b will stop conducting in the manner previously described with reference to 81a. A conducting condition thereupon occurs in triode 81a and will become stable irrespective of the decay of the negative pulse on marking bus 74.

To summarize, alternate spacing and marking conditions will cause the multivibrator tubes 81a and 81b to reach one of two conditions of stability, depending upon whether the spacing bus 73 or the marking bus 74 last developed a negative pulse.

The alternate conditions of stability of multivibrator tubes 81a and 81b are utilized to control the amplifier tubes 86a and 86b. The anode voltages of the triodes 81a and 81b are coupled discretely to cathode follower amplifiers 86a and 86b through resistances 87a and 87b, respectively. If a spacing pulse on bus 73 was last received, the condition of the multivibrator stability will be such that triode 81a is conducting and triode 81b non-conducting. The anode voltage of 81a in this condition will be less positive as previously described; this less positive voltage condition is transmitted through resistance 87a to the grid of triode amplifier 86a. Negative supply 88a overcomes the depressed or less positive voltage derived from 81a to cause triode 86a to stop conducting. The non-concurrent conducting condition of triode 81b provides a positive maximum of voltage at the anode of the latter tube; this positive maximum voltage is supplied through resistance 87b to the grid of triode amplifier 86b. The negative bias supply 88b has a value when combined with the positive maximum voltage which will allow triode 86b to conduct.

As there is no anode-cathode current through non-conducting triode 86a, there will be no voltage drop across cathode resistance 89a. However, the anode-cathode current drawn by conducting triode 86b provides a given voltage drop across the cathode resistance 89b. The combined cathode resistance voltage drop across 89a and 89b is applied to terminals 90a and 90b. Measurement of the voltage across terminals 90a and 90b will reveal a voltage proportional to the cathode current of 86b, terminal 90b being positive with respect to 90a. This resultant polarity of voltage at terminals 90b and 90a is derived by a pulse occurring on spacing bus 73. A subsequent marking pulse on the bus 74 will reverse the conduction conditions of amplifiers 86a and 86b previously described; cathode current will now be drawn by triode 86a through cathode resistance 89a while cathode current of 86b ceases to flow through resistance 89b. As a result, the voltage now measured across terminals 90a and 90b of the transmission line pair will have a value proportional to the cathode current flowing through resistance 89a; terminal 90a will now be positive with respect to terminal 90b.

To summarize: The polarity of the voltage recurring across terminals 90a and 90b will alternate with timed successive pulses respectively derived on the spacing and marking buses 73 and 74. In turn, the negative pulses obtained on these buses are timed by the controlled cycling of the transmitting distributor, and depend for context upon the reading of the tape perforation intelligence by the tape sensing mechanism of Fig. 5a, together with synchronizing signals for coordination of the transmitter and receiver.

The terminals 90a and 90b may be coupled to some medium of transmission such as a transmission line.

*Telegraph receiver system*

Figure 7A:
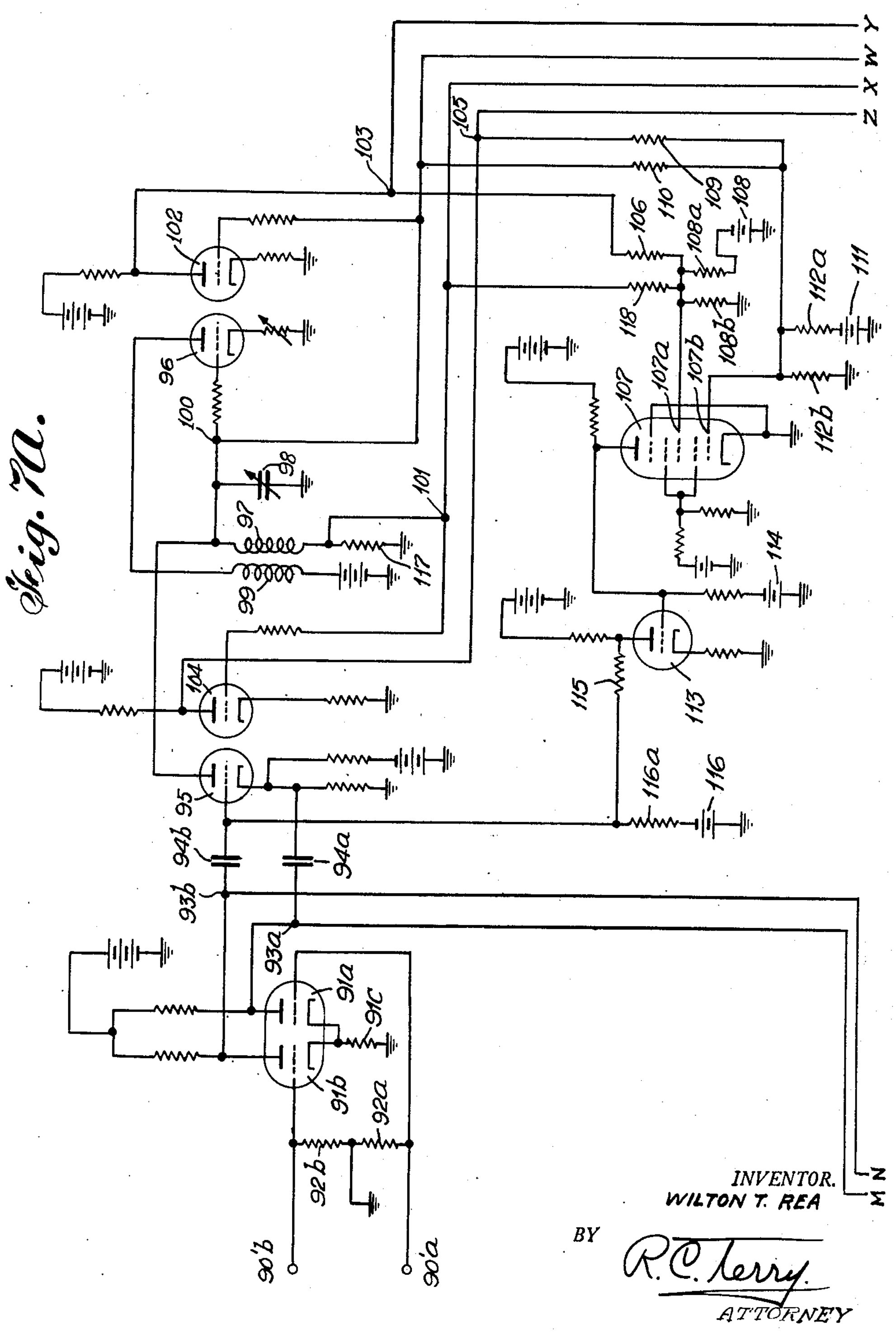
Figs. 7a and 7b show a schematic circuit diagram of a telegraph receiver in accordance with the invention.
Figure 7B:
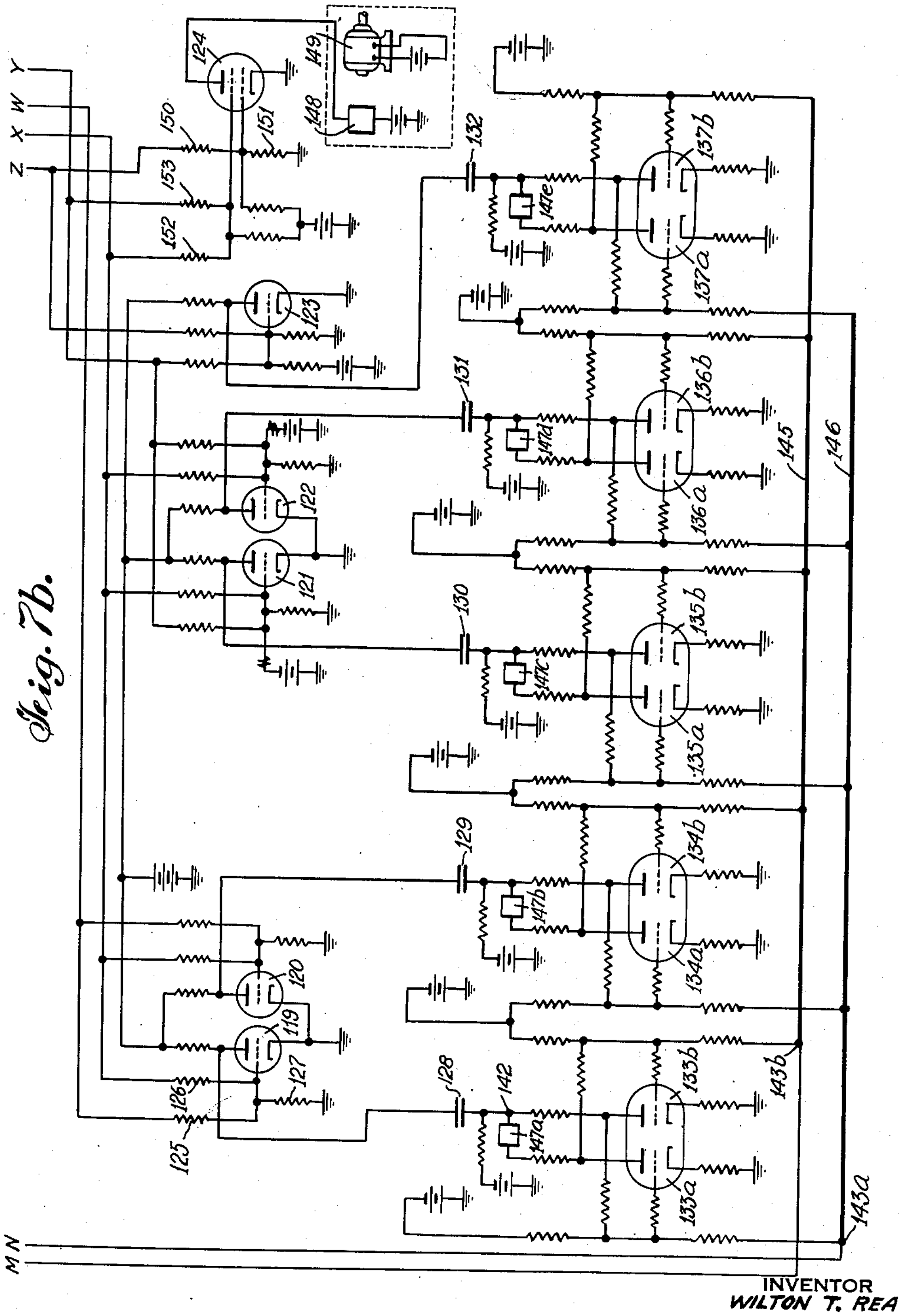

Figs. 7a and 7b, read together, show a telegraph receiver in accordance with the invention.

With reference to Fig. 7a, terminals 90'a and 90'b represent terminals at the receiver to which the remote termination of the transmission medium or line originating at terminals 90a and 90b of Fig. 6 may be connected. The polarized signals received at terminals 90'a and 90'b are impressed on the grids of amplifier triodes 91a and 91b. The energizing circuits of triodes 91a and 91b are arranged so that they will become conducting or non-conducting in an opposed manner, depending upon whether a marking or spacing condition exists upon the line. Thus, when a marking condition exists at the transmitter, it may be assumed that terminal 90'a will be positive with respect to terminal 90'b. As the cathodes of both triodes 91a and 91b are interposed electrically between terminals 90'a and 90'b by resistances 92a and 92b through ground and resistance 91c, the positive voltage applied by 90'a to the grid-cathode 91a will cause 91a to be conducting; the negative voltage applied by 90'b to the grid of triode 91b will cause 91b to be non-conducting. Under these conditions the anode-cathode voltages of the triodes 91a and 91b will be such that point 93b will be at a positive maximum; 93a will be at some less positive voltage. It is to be remembered that these voltage conditions apply when a marking condition occurs at the transmitter. A subsequent spacing condition received over the transmission medium at terminals 90'a and 90'b will reverse the conditions; 91a stops conducting, 91b conducts; 93a reaches positive maximum, point 93b becomes less positive.

In a telegraph system in accordance with the invention, the receiver may, for convenience, be considered as comprising two fundamental parts: one part comprising the receiver oscillator which may be called the "start-stop" oscillator; a second part comprising the receiver distributor and its associated gate circuits. The general plan is for the start-stop oscillator to control the operation of the receiver distributor ring. With the initiation of the start signal sent from the transmitter, the receiver oscillator is caused to commence operation and will continue until the stop signal is received from the transmitter. The receiver oscillator will remain quiescent until a succeeding start signal is received. In the excursion of the oscillator during the time between the start and stop signals, substantially synchronized control voltages are produced by the oscillator circuits and are impressed on the receiver distributor ring, causing it to advance. In turn, the receiver distributor ring opens and closes sequentially a group of cooperating gate circuits which, in effect, selectively switch the incoming signal to a plurality of receiver channels analogous to the five intelligence channels provided at the transmitter.

On Fig. 7a may be seen the circuits of the start-stop oscillator; in Fig. 7b is found the receiving distributor ring and its cooperating gate circuits. The voltage derived by line amplifiers 91a and 91b is transmitted simultaneously to the start-stop oscillator and to the receiver gate circuits.

*Receiver oscillator*

The voltage derived from the line amplifiers 91a and 91b at terminals 93a and 93b is transmitted through capacitances 94a and 94b to the cathode and grid, respectively, of oscillator start tube 95. To understand properly the function of the oscillator start tube, the oscillator and its associated circuits must first be considered.

Oscillator triode 96 is of the "tickler feedback" or tuned grid type, with operation as described with reference to the transmitter oscillator 37 of Fig. 6. The frequency of the receiver oscillator will depend upon the values of inductance 97 and capacitance 98; these should be such as to provide a fundamental frequency of the parallel resonant circuit close to that of parallel tuned circuit 38 and 39 in the transmitter. Oscillation is stimulated by positive feedback to the oscillator grid circuit from tickler coil 99 in the oscillator anode circuit. The inductance 97 will have voltages at the terminus of its winding differing by $\frac{\pi}{2}$ radians. As in the case of the transmitting inductance 38, the grid end 100 of inductance 97 will be assumed to evidence a voltage E sin $\omega t$; at the other end, 101, a voltage E cos $\omega t$. The voltage E sin $\omega t$ at point 100 is supplied in part to the grid-cathode circuit of a sine inverter triode 102. As with transmitter sine inverter tube 43, Fig. 6, 102 will have an anode-cathode voltage at point 103 having a characteristic $-$E sin $\omega t$, being displaced $\pi$ radians from the voltage of 100. Similarly, a portion of the cosine voltage at point 101 is supplied to the grid-cathode circuit of cosine inverter tube 104. As with cosine inverter tube 45, Fig. 6, the anode-cathode voltage of the cosine inverter tube 104 displays a voltage at point 105 having a characteristic $-$E cos $\omega t$, being displaced $\pi$ radians from the voltage of point 101. At points 103 and 105, a direct-current component results from the residual anode voltage of the inverter tubes. This direct-current component ordinarily requires neutralization in the distributor circuits.

Thus, at points 100, 101, 103 and 105, there will be found voltages having characteristics respectively: E sin $\omega t$, E cos $\omega t$, $-$E sin $\omega t$, and $-$E cos $\omega t$. These voltages are substantially identical in frequency and wave form to the ones utilized by the transmitting distributor of Fig. 6.

The oscillator of the receiver, however, is provided with additional circuits to carry out the start-stop feature. The oscillator control tube 95 has its anode-cathode circuit in parallel with the parallel tuned grid-cathode circuit of the oscillator triode. Dependent upon whether oscillator control tube 95 is conducting or non-conducting, the oscillator 96 will remain quiescent or oscillate by virtue of the presence or absence of the path presented to the resonant circuit via the space charge path of the control tube. For example, with a steady marking condition applied to terminals 90'a and 90'b and with the oscillatory circuit in its zero degree condition, a negative potential at point 101 and an equal positive potential at point 103 will cooperate via resistors 118 and 106 (the latter having the lower resistance) to maintain grid 107a of tube 107 at a positive potential. Likewise, a negative potential at point 100 and an equal positive potential at point 105 will cooperate via resistors 110 and 109 (the latter having the lower resistance) to maintain grid 107b at a positive potential. Tube 107 will, therefore, conduct and its plate will be at a relatively low positive potential. Consequently, tube 113 will be biased beyond cut-off by battery 114 acting via resistance 114a, and its plate will be at full positive potential. The grid of tube 95 will, therefore, assume a potential positive with respect to its cathode and current will flow in its plate circuit, which includes winding 97. The oscillatory circuit, damped by the impedance of the plate-cathode circuit of tube 95, will remain quiescent with energy stored equally in the inductance of winding 97 and in capacitor 98.

When a spacing signal is received at terminals 90'a and 90'b, the former will swing toward negative and the latter toward positive. Plate current flow will be initiated in triode 91b and plate current will cease to flow in triode 91a. The swing of the plate voltages of these triodes will cause a negative impulse to be applied via condenser 94b to the grid of triode 95, and a positive impulse to be applied via condenser 94a to the cathode of triode 95. Current will cease to flow in the plate circuit and the damping effect of said plate circuit will be removed. The energy stored in capacitor 98 will flow into inductance 97 until the voltage across resistor 117 attains a maximum value and simultaneously, the voltage across capacitor 98 becomes zero. Thereafter, the energy will flow from inductance to capacitance and thus oscillation is initiated.

Before the impulses applied via condensers 94a and 94b to triode 95 have terminated, the voltages at points 101 and 103 will have progressed sufficiently far negative to swing grid 107a beyond cut-off. Said grid will remain negative until the half-cycle point of the oscillation has been passed, and grid 107b, which initially progressed toward positive, will become negative slightly before the half-cycle point of oscillation. While one or the other of these grids remains negative, the flow of plate current in tube 107 will remain interrupted and the plate potential of this tube will remain at full positive value. Consequently, current flows in the plate-cathode circuit of tube 113, whose plate potential is thereby held only slightly positive. This causes tube 95 to remain cut off, even though the incoming signal may resume the marking condition.

Grids 107a and 107b will not again become simultaneously positive until shortly before the end of the cycle. When they do, tube 107 conducts, cutting off tube 113 and causing tube 95 to conduct. Consequently, at the end of one cycle of oscillation, the oscillator stops and waits for the receipt of a succeeding spacing signal.

Thus the stop condition of the oscillator is stably maintained over the stop segment as transmitted from the transmitter.

Upon reception of the start signal of the succeeding distributor cycle which has been assumed to be a spacing signal, the terminal 90'b will become positive with respect to 90'a. Current will now flow in amplifier triode 91b as a result of the positive voltage thereby applied to its grid-cathode circuit. By the same token, the grid of amplifier triode 91a becomes more negative with respect to its cathode as a result of the change of terminal polarity; triode 91a will stop conducting. The resultant effect will be to depress the anode voltage of triode 91b and raise the anode voltage of triode 91a. This will be transmitted to the grid-cathode circuit of control tube 95 as a negative grid voltage pulse.

The negative grid voltage pulse at control grid 95 causes the oscillator control tube to cease conducting, unclamping the oscillator triode 96 which now will start oscillation. In turn, the voltage at point 100 will become less negative, more current will then flow in the sine inverter tube 102, and the sine inverter tube anode voltage at point 103 will be depressed. Initiation of oscillation will simultaneously increase the negative voltage to be found across resistance 117, causing point 101 to become more negative. This more negative voltage, applied to the grid of the cosine inverter tube 104, increases the anode voltage of that tube, making point 105 more positive. The potentials on leads 103 and 101 being less positive and more negative, respectively, act through resistances 106 and 118 to the grid 107a of the stop tube 107. The stop tube 107 will have its anode-cathode current interrupted as a result of the more negative voltage applied to grid 107a. While points 100 and 105 become less negative and more positive, respectively, the resultant more positive change applied through resistances 108 to 110 to the grid 107b will fail to maintain or restore the flow of current through the stop tube 107; the control grids are effectively in series in the space charge path of 107, and cut-off at grid 107a will control the discharge path.

Cessation of current flow in stop tube 107 causes a resultant rise in its anode voltage. This rise of anode voltage overcomes the negative voltage obtained from bias source 114, and the inverter tube 113 will start conducting. As inverter tube 113 conducts, the depressed anode voltage resultant is transmitted through resistance 115 to the control grid of the oscillator start tube 95. This less positive voltage, in combination with the negative bias supply 116 operating through resistance 116a, depresses the control grid-cathode voltage of the oscillator start tube to a point at which the oscillator start tube stops conducting; a new condition of stability results. In the new stable condition, the oscillator control tube 95 is held non-conducting; this allows oscillator tube 96 to provide the desired excursions of sin and cos voltage for the operation of the receiver distributor.

*Receiver distributor ring*

When the oscillator tube 96 commences its excursions of voltage in response to the received spacing start signal, sinusoidal voltages will appear at point 100, point 101, point 103 and point 105 and to the connected terminals W, X, Y and Z in Figs. 7a and 7b. W, X, Y and Z are supplied respectively with voltages having characteristics E sin $\omega t$, E cos $\omega t$, $-$E sin $\omega t$ and $-$E cos $\omega t$. In addition to these alternating voltages, residual direct voltages resulting from applied anode potentials utilized in the inverter circuits are present and must be neutralized when applied to the receiver distributor ring.

The distributor ring tubes, 119 through 123, provide sequentially timed controlling voltage pulses for interpretation of the intelligence signals provided by the transmitter. According to the general plan, receiver gate tubes are opened at instants corresponding to the centers of the segments of the transmitting distributor cycle; the spacing or marking condition of buses 73 and 74 at these instants will actuate the receiver gate tubes accordingly. The receiver gates will therefore provide an output for each cycle of distributor rotation, selectively responsive to the perforated and unperforated tape readings representative of the intelligence to be transmitted.

A unique distributor ring tube, 124, will reflect completion of one cycle of receiver distributor operation; will respond with the transmitted marking stop signal.

The utilization of the output derived from the receiver gates controlled by the intelligence distributor tubes as well as the output of tube 124 will later be described.

The operation of any one receiver distributor ring tube will be typical of all the remaining tubes of the ring. For example, triode 119 provides the initial response of the receiver distributor after the received spacing start signal has set the receiver oscillator into operation. The oscillator voltages now to be found at terminals W and X, E sin $\omega t$ and E cos $\omega t$, are transmitted to the grid-cathode circuit of tube 119 through a network comprising resistances 125, 126, and 127. It will be noted that the latter network is of the same configuration described both with reference to the transmitting distributor ring tubes 47, Fig. 6, the distributor tubes of Fig. 3, and the circuit of Fig. 1c. In common with these, the magnitudes of resistances 125—127 are selected together with the voltages applied thereto to provide a given phase angle $\theta'_1$ at which tube 119 starts to conduct.

In selecting this phase angle $\theta'_1$, the first receiver distributor tube 119 should begin to conduct at an instant substantially at the mid-point of the first intelligence segment of the transmitting distributor. The first intelligence segment lies in time between the initial conduction of the first intelligence transmitting distributor tube 47, Fig. 6, and the initiation of conduction of the second intelligence transmitting distributor tube 48. During this first segment, it has been shown that the intelligence to be found by the tape sensing armature 28, i. e., the perforation 27 of tape 25, is transmitted.

With regard to the transmitter, arbitrary values chosen for the initiation of conduction of transmitting distributor tubes 47 and 48 were at 48½ degrees and 97 degrees, respectively. While the transmitting and receiving distributors are in substantial synchronization through the coordination offered by the start-stop signal and proximity of oscillator frequencies, slight variations may occur from cycle to cyle. To avoid the possibility that the receiver may misinterpret a received signal, it has been found advantageous to initiate the conduction of the receiving distributor tubes to coincide in general with a point near the mid-point of the segment to be interpreted. This will allow a margin for error, due to signal distortion and other causes, on each side of the various receiving distributor sampling points. Thus, the phase angle $\theta'_1$ assigned to the first receiving distributor tube 119 may arbitrarily be 72¾ degrees, the sum of 48½ and 24¼ degrees which are respectively the phase angle of the start element and ½ the phase angle of the first intelligence element, thereby coinciding with the mid-point in the transmitted first intelligence segment.

At the point $\theta'_1$ in the distributing cycle, the control grid of the first receiving distributor tube 119 becomes positive and 119 conducts. Conduction of triode 19 depresses its anode voltage, causing an excursion toward a less positive potential which is transmitted as a negative pulse through capacitance 128. At a given period of time $\pi$ radians later, the grid of the distributor tube 119 will become negative as a result of the excursion of grid voltage applied thereto from the voltage sources of the receiver oscillator; a positive pulse will be transmitted through capacitance 128.

Similary, negative and positive pulses are produced by the subsequent receiving distributor tubes 120, 121, 122 and 123, at points approximately in the mid-points of the second, third, fourth and fifth intelligence segments of the transmitting distributor cycle, and resultant negative and positive pulses will be transmitted respectively through capacitances 129, 130, 131 and 132. Arbitrary mid-point values for the various values of angle $\theta'$, at which the distributor tubes 120 to 123 start conducting, are: 121¼ degrees, 169¾ degrees, 218¼ degrees and 266¾ degrees from the beginning of the distributor cycle.

*Receiver gate tubes*

Receiver gate tubes controlled by the receiving distributor ring are shown in Fig. 7*b* as 133*a* and *b* through 137*a* and *b*. A detailed analysis of the operation of these novel gate circuits, which also act to store intelligence, may be made with reference to Fig. 9.

Figure 9:
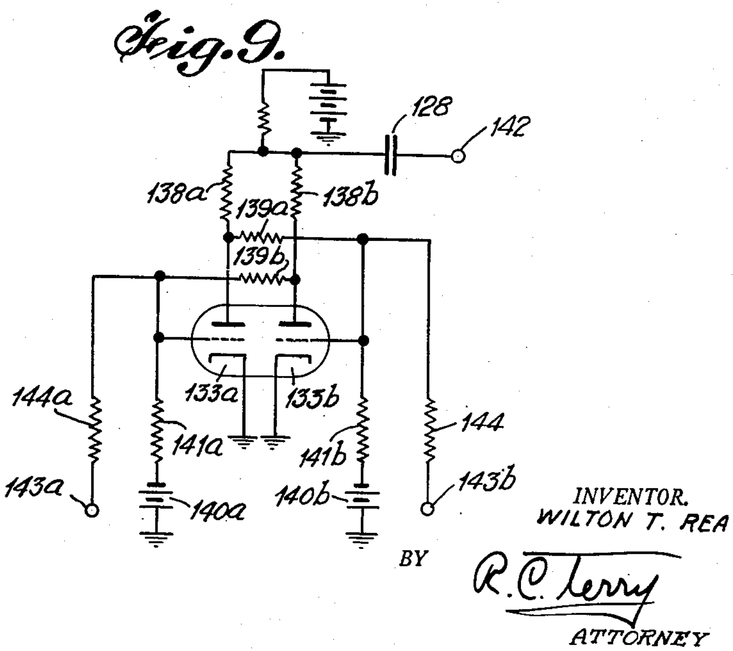
Fig. 9 shows a gate selector circuit utilized in Fig. 7b.

In Fig. 9, a multivibrator having two conditions of stability comprises triodes 133*a* and 133*b*. At any given time when one of the triodes, for example 133*a*, is conducting, the other triode 133*b* will be non-conducting. The alternate condition of stability finds triode 133*b* conducting, 133*a* non-conducting. Assuming, for illustration, that triode 133*a* is conducting, the anode voltage of this triode will be depressed by the voltage drop across resistance 138*a*. This depressed voltage will be transmitted through resistance 139*a* to the grid of triode 133*b*. The depressed anode voltage reacts with a negative voltage derived from bias source 140*b* operating through bias resistance 141*b*. Assuming for the moment that these are the sole voltages supplied to the grid of 133*b*, the energizing circuits of triode 133*b* have values at which the depressed anode voltage of triode 133*a* will reflect as a negative voltage below cut-off in the grid-cathode circuit of triode 133*b*. Thus, the triode 133*b* remains non-conducting; the anode voltage of the latter tube will remain at a positive maximum. In turn, this positive maximum voltage is transmitted through the resistance 139*b* to the grid of triode 133*a*, where it will react with a negative voltage from bias source 140*a* operating through bias resistance 141*a*. The energizing circuits of the triode 133*a* have values at which the positive maximum of voltage derived from the anode of triode 133*b* reflects as a positive voltage above saturation at the grid-cathode circuit of triode 133*a*. Triode 133*a* will therefore be sustained in the conducting condition. Thus, until other factors intervene, the triode 133*a* remains conducting; 133*b* remains non-conducting.

It will be obvious to one skilled in the art that if a condition is assumed at which triode 133*b* is conducting, a stable condition results wherein 133*a* is non-conducting.

The alternate stability of the multivibrator may be selectively controlled by appropriate application of control voltages to terminals 142, and 143*a* or 143*b*. The magnitude of the energizing voltages applied to each of the triodes through the resistance of paths described is so chosen that with no potentials applied to terminals 142, 143*a* and 143*b*, the grid circuit potential of the conducting triode exceeds the saturation value of the triode by a magnitude greater than some value: *v*. Similarly, the grid circuit potential of the non-conducting triode falls below the cut-off value by a magnitude greater than *v*. If these circuit conditions are satisfied, the application of either positive or negative voltages having a magnitude equal to *v* or less to terminals 143*a* and 143*b* will not disturb the stable condition of the multivibrator. On the other hand, application of a positive or a negative voltage to terminal 142 can be such as to change the operating parameters of the multivibrator circuit to an extent that the application of a positive or negative voltage having a value *v*, either to terminal 143*a* or to 143*b*, will change the relative stability condition of the multivibrator. Two polarities of voltage may be applied to terminal 142. If a voltage of the proper magnitude applied to 142 is positive with respect to ground, the increased positive anode potential thus applied to both the anodes of triodes 138*a* and 138*b* will change the grid circuit potential of the non-conducting triode sufficiently that if a positive voltage, *v*, is applied to the grid of the non-conducting triode, the latter triode will pass from the non-conducting to the conducting condition.

By way of example, if triode 133*a* is conducting and 133b is non-conducting, an increased positive anode potential on triode 133b results from a positive potential or impulse applied to terminal 142. The grid circuit potential of triode 133b, at which the latter tube may rise above the cut-off point, will be reduced by the increased anode operating potential. If, at the same time the positive voltage or pulse is delivered to terminal 142, a negative voltage of value v is supplied from terminal 143b to the grid of 133b through the resistance 144b, 133b will remain non-conducting; the relative condition of multivibrator stability remains unaffected. If, however, with the application of a positive voltage to terminal 142, a positive impulse, v, is applied to terminal 143b, the grid circuit potential of 133b will reach above the cut-off point, allowing the triode 133b to conduct. The relative multivibrator stability will be altered; triode 133a becomes non-conducting, 133b conducting.

The positive pulse supplied to terminal 142 during the original period when triode 133a was conducting will not, of itself, affect the conditions within triode 133a. Increasing the anode potential of the already conducting triode 133a will make the grid circuit potential of this tube even more remote from the control of voltage pulses applied to terminal 143a. If, however, a negative impulse or potential is supplied to terminal 142, the grid circuit saturation potential of the conducting triode will be changed sufficiently to allow a negative voltage, v, to change the triode condition from conducting to non-conducting. Thus, assuming that triode 133a is conducting, 133b non-conducting, a negative potential or impulse applied to terminal 142 will depress the anode potential of the non-conducting triode to a point that a negative potential or impulse, v, applied to the grid circuit of the conducting triode, will make the triode 133a non-conducting. The multivibrator stability will be altered accordingly. If when the negative impulse is applied to termnial 142 a positive voltage, v, is applied to terminal 143a, it follows that no effect will be rendered on triode 133a as it is already conducting at saturation. Changes in the condition of multivibrator stability will be called "tripping" of the multivibrator circuit.

It should be noted that the magnitude of impulse or potential applied to terminal 142 required to alter the conditions of stability is much greater in the case of a positive voltage than for a negative voltage. This polarity discrimination results from the fact that a negative voltage supplied to terminal 142 passes through the anode resistance of the non-conducting triode to the grid circuit of the conducting triode. This path will not be attenuated by the shunt resistance offered by the internal anode resistance of the non-conducting triode; manifestly, as the triode is not conducting, its internal resistance is very high. Conversely, a positive potential applied to terminal 142 passes through the anode resistance of the conducting triode to the grid of the non-conducting triode. This path will be attenuated by the shunting effect resulting from the relatively low internal resistance of the conducting triode.

It will be seen that if terminal 142 is supplied from a source alternately containing both positive and negative potentials of approximate equal magnitude, the multivibrator may be made to discriminate against the positive potentials. As a result, voltages of negative polarity alone can be caused to accomplish the selecting function. The circuit of Fig. 9 may therefore be arranged so that only the negative pulses supplied to terminal 142 cooperate with pulses supplied to terminals 143a and 143b in selection of multivibrator stability conditions. Positive voltages supplied terminal 142 will then remain ineffective to control the multivibrator.

Referring again to Fig. 7b, it will be seen that the multivibrator gate circuit described with reference to Fig. 9 is utilized in conjunction with the pulses derived from the receiver distributor applied to terminal 142; marking and spacing signals derived from the output of amplifiers 91a and 91b, Fig. 7a, are applied discretely to terminals 143a and 143b.

Output signals from amplifying triodes 91a and 91b to be found on points 93a and 93b are supplied not only to the oscillator start tube circuits, as previously described, but are supplied through terminals M and N of Figs. 7a and 7b to buses 145 and 146, respectively. In carrying signal continuity between the transmitting circuits of Fig. 6 through the amplifier tubes 91a and 91b of Fig. 7a, it may be shown that for the marking and spacing polarities assumed, a marking line condition results in a negative voltage on bus 145 and a positive voltage on bus 146. Conversely, a spacing line condition will result in a positive voltage on bus 145 and a negative voltage on bus 146.

If the energizing circuits and supplying resistances of the individual receiver gates are chosen to discriminate against positive voltages supplied from the distributor ring to terminals corresponding to 142, it follows that only the negative voltages applied to buses 145 and 146 will trip the receiver gates. Thus, negative voltages developed alternately on the marking and spacing buses will trip the multivibrator; the tripping will be timed in accordance with the negative voltage derived from the receiver distributor ring. The voltage delivered to the receiver gate terminals corresponding to 142 is in the nature of transient pulses; capacitances 128—132 will dispose of non-transient distributor voltages. As a marking line condition produces negative pulses only on bus 145, 145 will be called the receiver marking bus. Similarly, as spacing line conditions produce negative pulses on bus 146 only, 146 will be called the spacing bus.

The magnitude of negative voltages supplied from the amplifiers 91a and 91b in Fig. 7a is required to be sufficiently large to effect tripping of the receiver gate tubes when combined with the timed negative pulses derived from the receiver multivibrator ring. To reach this desired magnitude, additional amplifiers may be cascaded with 91a and 91b.

To illustrate the operation of the receiver gate circuits, further reference may be made to Fig. 7b. If the signal received during the preceding distributor cycle left multivibrator tubes 133a and 133b in respective conducting and non-conducting condition, these stability conditions will remain over the duration of this preceding distributor cycle. As the first intelligence segment of the present distributor cycle is reached, the first distributor ring tube 119 will provide a negative pulse through capacitance 128 to the point 142. A negative pulse at point 142 offers the multivibrator or receiver gate an opportunity to trip. At the instant that the distributor offers a tripping possibility to the multivibrator, either a marking or spacing condition exists at the transmission line. If a spacing condition exists, a negative voltage will be found on spacing bus 146 and a corresponding negative potential will be applied to point 143*a*. This negative potential at 143*a* will trip the multivibrator when the negative pulse at point 142 provides the opportunity, that is, tube 133*a* now is forced to become non-conducting, thereupon causing triode 133*b* to become conducting, the alternate condition of stability. If it had been assumed that a marking line condition existed when the tripping opportunity was offered by the negative pulse at point 142, a negative pulse on marking bus 145 resulting would be applied through terminal 143*b* to the grid of triode 133*b*. As triode 133*b* was already assumed to be non-conducting in accordance with the ultimate condition of stability achieved in the preceding distributor cycle, the negative potential in 143*b* would have no effect; the multivibrator gate would reject the opportunity to trip and would remain in the same condition of stability.

It follows then that the receiver multivibrator gates will be tripped only when successive signals of the segment to which the particular gate circuit is cooperative are of opposite character. Thus, if the preceding distributor cycle first segment intelligence produced a marking line condition, a marking condition of the first segment of the successive distributor cycle will leave the receiver gate circuit untripped; if, however, a spacing line condition exists in the first segment of the successive distributor cycle, the receiver gate would be tripped.

Each of the receiver gate tubes 133*a* and 133*b* through 137*a* and 137*b* will successively be offered an opportunity to trip by negative pulses supplied from the receiver distributor as it progresses in its cycle of negative pulse generation. Either marking or spacing line conditions resulting in negative potentials on receiver buses 145 and 146 will combine with the successive, discrete negative distributor pulses to trip the receiver multivibrator gates responsive to the intelligence originally supplied by the tape sensing mechanism. Because of the discriminatory nature of the receiver gates, positive pulses resulting from the non-conduction of the respective receiver distributor tubes will not affect the receiver gates.

The relative stability condition of each of the receiver gate tubes 133*a* and *b* through 137*a* and *b* may be utilized to operate selectively electromagnets 147*a* through 147*e* respectively. Magnets 147*a* through 147*e* represent selecting magnets of a permutation code selector mechanism. In such a mechanism, code bars, discs and miscellaneous selecting elements are operated by individual magnets; 147*a* through 147*e* may thus represent the five selector magnets of a permutation code-operated telegraph receiving recorder as disclosed in United States Patent 1,665,594 to H. L. Krum, granted April 10, 1928. The disclosure of this patent to Krum is herein incorporated by reference as part of the present specification. Magnets 147*a* through 147*e* operate to set permutation code selector elements in combinational positions corresponding to the selectively energized magnets. An additional magnet 148, the operation of which is later described, is operable as disclosed in the aforementioned Krum patent, establishing a drive connection between the motor 149 and apparatus fully disclosed in the Krum patent for giving effect to the selective setting of the code elements and for performing the recording or functional operation corresponding to such selection.

For each receiving distributor cycle, the individual receiver gate tubes—133*a* and *b* through 137*a* and *b*—will be offered the opportunity to trip, depending upon polarity conditions in the receiver marking and spacing buses. Each of the magnets 147*a* through 147*e* will react to the stability condition of the receiver gate tube with which it cooperates; the actuation or non-actuation of the electromagnets will depend upon received marking and spacing conditions derived from the perforated or unperforated portions of the tape 25.

The operation of the selector magnets may be analyzed by reference to a typical selector magnet 147*a*, cooperating with the first segment receiver gate tube 133*a* and 133*b*. It has been said that a marking line condition at the time that the receiver distributor ring offers the receiver gate tube the opportunity to trip will result in 133*a* being conducting, 133*b* non-conducting. Conversely, a spacing line condition at the time the receiver distributor ring offers the first segment receiver gate tube the opportunity to trip will result in 133*a* being non-conducting; 133*b* conducting. Selector magnet 147*a*, connected in series with the anode-cathode circuit of 133*a*, will respond only during the conducting period of triode 133*a*. Subsequent cessation of current flow in 133*a*, resulting from a new first segment line condition in the subsequent distributor cycle, deactivates selector magnet 147*a*. Similarly, each of the remaining receiver gate tubes 134*a* and 134*b*—137*a* and 137*b* will cause the remaining selector magnets 147*b*—147*e* to become either actuated or non-actuated, depending upon the nature of the intelligence received and thus, in turn, upon the perforated or unperforated conditions of the tape 25.

The conduction of tetrode 124 of the receiver distributor ring is timed to correspond with the transmitted stop pulse at the end of the distributor cycle. The time at which tetrode 124—the receiving distributor ring stop tube—becomes conducting is determined by the phase of the voltage applied from line Z through resistances 150 and 151 to the lower grid. The upper grid, under the influence of lines X and Y through resistances 152 and 153, is already positive at this time. This operation is analogous to the control exerted over the transmitter distributor tube 53 as previously described. The conduction of the tube 124 causes magnet 148 to be actuated.

Tetrode 124 remains conducting until a short time later when its upper grid, controlled from lines X and Y through resistances 152 and 153, becomes negative. With the return of 124 to the non-conducting condition, 148 is deactivated. The net effect will be to energize magnet 148 momentarily during reception of the stop pulse.

Energizing magnet 148 sets in operation the selecting and recording mechanism of the printer by tripping the clutch as disclosed in the Krum patent. Only a momentary energization of magnet 148 is required to accomplish the necessary result; at the end of the necessary interval, caused by the return of tetrode 124 to the non-conducting condition, magnet 148 is deenergized as described. Reference to the Krum patent discloses that it is not necessary for magnet 148 to remain energized during the selecting and printing cycle there described; the selector elements controlled become locked in the selective setting established by the magnet and the subsequent release of the magnet has no effect on the selector elements. The selector magnets shown in the Krum patent are required merely to trip latches, permitting the selector elements to be removed by springs to their marking position; it is therefore unnecessary that the selector magnets remain energized until the selector elements are actually locked. A mechanism operated by the operating motor of the printer, here designated 149, returns the selector elements to latched condition in the spacing position after a selection has been made. The recording or functional operation has been initiated preparatory to control of the selector elements by the selector magnets 147*a* through 147*e* in response to the succeeding code combination sensed at the tape sensing mechanism and transmitted.

With the operation of magnet 148 and the heretofore described clamping of oscillator 95 by the inverter tube 113, one full cycle of the transmitter and receiver is completed. The apparatus is ready to respond to the succeeding combination transmitted by the tape sensing mechanism and the cycle of operation described is repeated.

What is claimed is:

1. An electronic switching device comprising, a source of plural oscillatory potentials having predetermined phase differences, a plurality of electron discharge tubes having at least one control electrode, and connections from said source to said control electrode for causing each tube to be conductive at a time and during an interval in each cycle of said source dependent upon the combination of potentials supplied to the control electrode of the tube by the said source over said connections.

2. In an electronic switching device, a source of a plurality of oscillatory potentials having predetermined phase differences, a plurality of electron discharge tubes each having control electrodes, and a plurality of impedance networks discretely transmitting the said potentials to the control electrodes of the said discharge tubes, said networks having values at which each tube is conductive at a time and during an interval in each cycle of said potentials dependent upon the combination of potentials transmitted over the said networks to the control electrodes thereof.

3. In an electronic switching device, a source of a plurality of sinusoidal potentials having quadrature phase differences, a plurality of thermionic discharge tubes each having control grids and a cathode, and a plurality of networks, each one of said networks transmitting a combined portion of the said potentials to the control grid-cathode circuits of the said discharge tubes, said networks having values at which each tube is conductive at a predetermined time and interval in each cycle of said potentials dependent upon the combination of potentials transmitted over the said networks to the control electrodes thereof.

4. In an electronic switching distributor, a plurality of thermionic discharge tubes each having a cathode, first and second control grids, means to render said discharge tubes discretely and selectively conducting and non-conducting, said latter means comprising a source of sinusoidal control voltages in quadrature relationship, a plurality of resistive networks, one of said networks coupled to each of the grid-cathode circuits of the said thermionic discharge tubes, and a connection between selected pairs of the said control voltages and the said resistive networks, whereby the said discharge tubes are rendered conductive and non-conductive according to the selection of the said selected control voltages and the magnitudes of the said plurality of networks.

5. In an electronic switching distributor, a plurality of thermionic discharge tubes each having a cathode, first and second control grids, means to render said discharge tubes discretely and selectively conducing and non-conducting, said latter means comprising, a source of sinusoidal control voltages in quadrature relationship and of a common frequency, a first plurality of resistance elements coupled in discrete pairs to the control grids of the said thermionic discharge tubes and individually to selected ones of the said control voltages, and a second plurality of resistive elements severally connected in the grid-cathode circuits of the said thermionic discharge tubes, the resistive elements of the said first and second plurality of resistive elements having values at which the said discharge tubes are rendered conducting and non-conducting at a predetermined time and for a predetermined interval in each cycle of frequency of the said control voltages.

6. In a telegraph system, an impulse signal source, transmitting and receiving distributors each having a pulsed output and each including a plurality of thermionic discharge tubes having a control electrode, means to render the said thermionic discharge tubes sequentially conducting, said latter means comprising a source of oscillatory potentials having predetermined phase differences, a plurality of networks to couple the said potentials in discrete portions to the control electrodes of the said thermionic discharge tubes, means to modulate the output of the said transmitting distributor in accordance with the said impulse signal source, a plurality of receiver gate circuits activated by the pulsed output of the said receiving distributor and the said modulated output of the said transmitting distributor, and means to synchronize the said transmitting and receiving distributors.

7. A telegraph system comprising, a permutation code signal source, a telegraphic printing device, a transmission medium, transmitting and receiving distributors each having a pulsed output and including a plurality of thermionic discharge tubes having a control electrode, means to render the said thermionic discharge tubes sequentially and repetitively conducting, said latter means comprising a source of oscillatory potentials having predetermined phase differences, a plurality of resistive networks to couple the said potentials in discrete portions to the control electrode of the said thermionic discharge tubes, means to modulate the pulsed output of the said transmitting distributor in accordance with the said permutation code signals, means to apply the said modulated pulse output to the said transmission medium, a plurality of receiver gate circuits coupled to the said transmission medium, said gate circuits being activated by the pulsed output of the said receiving distributor and the said modulated output of the said transmitting distributor, means to couple the said receiver gate circuits to the said telegraphic printing device, and means to synchronize the said transmitting and receiving distributors.

8. A telegraph system comprising, a permutation code signal source, a transmission line, a telegraph printing device, transmitting and receiving distributors each having a pulsed output and each including a plurality of thermionic discharge tubes having a control grid and a cathode, means to render the said thermionic discharge tubes sequentially and cyclically conducting, said latter means comprising a plurality of sinusoidal voltages of quadrature phase displacement, a plurality of resistive networks to couple the said sinusoidal voltages in selected pairs to the individual control grid-cathode circuits of the said thermionic discharge tubes, means to modulate the pulsed output of the said transmitting distributor in accordance with the said permutation code signals, multivibrator means having stored conditions responsive to the modulated pulsed output of the said transmitting distributor, means to derive a signal on the said transmission line in accordance with the stored condition of the said multivibrator, a plurality of multivibrator receiver gate circuits activated by the pulsed output of the said receiving distributor and the said signals on the said transmission line, and means to synchronize the said transmitting and receiving distributors.

9. In a telegraph signal transmission system, a source of code signals having permutation groupings, a pulse generator having a timed, sequential and cyclic output, said pulse generator including a plurality of thermionic discharge tubes having a control electrode, a source of sinusoidal control voltages in quadrature relationship, a plurality of resistive networks, each network interposed between individual control electrodes of the said thermionic discharge tubes and the said control voltages, a multivibrator having two conditions of stability, means to control selectively the said conditions of multivibrator stability in accordance with a combination of the said signal groups and the pulse generator output, and means to derive an output signal responsive to the stability conditions of the said multivibrator.

10. In a telegraph signal transmission system according to claim 9, wherein the said thermionic discharge tubes include a cathode, and said plurality of resistive networks comprise a first plurality of resistive elements coupled in pairs to the control electrodes of the said thermionic discharge tubes and severally to the said sources of control voltages, and a second plurality of resistive elements individually connected in the control electrode cathode circuits of the said thermionic discharge tubes.

11. In a telegraph signal transmission system, a source of permutation groups having intelligence impulses, a pulse generator having a timed, sequential and cyclic output, said pulse generator including a plurality of thermionic discharge tubes having a control electrode, a source of sinusoidal control voltages in quadrature relationship, a plurality of resistive networks, each network interposed between individual control electrodes of the said thermionic discharge tubes and the control voltages, means to modulate a portion of the output of the said pulse generator in accordance with the said intelligence impulses, means to derive stop and start impulses from the remaining portion of the output of the said pulse generator, a multivibrator having two conditions of stability, means to control selectively the said conditions of multivibrator stability in accordance with the said start, intelligence modulated and stop impulses, and means to derive an output signal responsive to the stability conditions of the said multivibrator.

12. In a tape operated telegraph transmitter, a tape sensing mechanism to derive permutation code groups having intelligence impulses, a stepping device for advancing the said tape sensing mechanism, a pulse generator having a timed, sequential and cyclic output, said pulse generator including a plurality of thermionic discharge tubes having a control grid and cathode, a source of sinusoidal control voltages in quadrature relationship, a plurality of resistive networks to transmit the said control voltages to the control grid-cathode circuit of the said discharge tubes and having a value at which the said discharge tubes will be rendered successively and cyclically conducting at predetermined times, means to modulate a portion of the output of the said pulse generator in accordance with the said intelligence impulses, means to derive stop and start impulses from the remaining portion of the output of the said pulse generator, a multivibrator having two conditions of stability, means to control selectively the said conditions of multivibrator stability in accordance with the said start, intelligence modulated and stop impulses, means to derive an output signal responsive to the stability conditions of the said multivibrator, and means to activate the said stepping device in accordance with the said stop impulses.

13. In a tape operated telegraph transmitter, a tape sensing mechanism to derive permutation code groups having intelligence impulses, a stepping device for advancing the said tape sensing mechanism, a transmitting distributor having a given cycle of operation, means to derive an output signal from the said distributor in accordance with the said intelligence impulses, and means to activate the said stepping device, said latter means including a thermionic discharge tube having first and second control grids and a cathode, a source of sinusoidal control voltages in quadrature relationship, first and second resistive networks to transmit the said control voltages in selected portions to the first and second control grid-cathode circuits of the said discharge tube respectively, said first and second networks having values at which the said discharge tube will be rendered cyclically conducting at a predetermined time in the cycle of the said distributor.

14. In a tape operated telegraph transmitter, a tape sensing mechanism to derive permutation code groups having intelligence impulses, a stepping device for advancing the said tape sensing mechanism, a transmitting distributor having cyclic, sequential pulsed output, means to derive a start impulse from the output of the said distributor, means to modulate a portion of the output of the said distributor in accordance with the said intelligence impulses, means to derive a stop impulse and to activate the said stepping device, said latter means including a thermionic discharge tube having first and second control grids and a cathode, a source of sinusoidal control voltages in quadrature relationship, first and second resistive networks to transmit the said control voltages in selected portions to the first and second control grid-cathode circuits of the said discharge tube respectively, said first and second networks having values at which the said discharge tube will be rendered cyclically conducting at a predetermined time in the cyclic output of the said distributor, a multivibrator having two conditions of stability, means to control selectively the said conditions of multivibrator stability in accordance with the said start, intelligence modulated and stop impulses, and means to derive an output signal responsive to the stability conditions of the said multivibrator.

15. In a telegraph signal reception system, signal responsive means, a source of alternating potentials having predetermined trigonometric relationships, a pulse generator driven by the said source of potentials and having a timed, sequential and cyclic output, said pulse generator including a plurality of thermionic discharge tubes having a control electrode, a plurality of resistive networks, each network interposed between individual control electrodes of the said thermionic discharge tubes and the said source of potentials, and means to derive a received output from the said signal responsive means and the pulses of the said generator.

16. In a telegraph signal reception system according to claim 15, wherein the said thermionic discharge tubes include a cathode, and said plurality of resistive networks comprise a first plurality of resistive elements coupled in pairs to the control electrode of the said thermionic discharge tubes and severally to the said source of potentials, and a second plurality of resistive elements individually connected in the anode-cathode circuit of the said thermionic discharge tubes.

17. In a telegraph signal system according to claim 15, wherein the said means to derive a received output for the said signal responsive means and the pulses of the said generator comprise, a plurality of multivibrators having two conditions of stability, means to offer the multivibrator a change of stability at predetermined periods in accordance with the pulses of the said generator, and means to select the condition of multivibrator stability with the said signal responsive means.

18. In a telegraph signal reception system, a received signal source comprising intelligence and synchronizing impulses, a source of sinusoidal control voltages in quadrature relationship, means to render the said source of potentials operative and inoperative selectively in accordance with the synchronizing impulses of the said received signal source, a pulse generator activated by the said source of potentials and having a timed, sequential and cyclic output, said pulse generator including a plurality of thermionic discharge tubes having a control electrode, a plurality of resistive networks, each network interposed between individual control electrodes of the said thermionic discharge tubes and the said source of potentials, and a plurality of receiver gate circuits discretely controlled by a combination of the intelligence impulses of the said received signal and pulses of the said generator.

19. In a telegraph signal receiver, a received signal comprising intelligence and synchronizing impulses, a source of sinusoidal control voltages in quadrature phase displacement and of a common frequency, means to render the said source of potentials selectively operative and inoperative in accordance with the synchronizing impulses of the said received signal, a receiver distributor activated by the said source of potentials and having a pulsed output, said distributor including a plurality of thermionic discharge tubes having a control grid and cathode, a first plurality of resistive elements coupled in discrete pairs to the control grids of the said thermionic discharge tubes and individually to selected ones of the said control voltages, a second plurality of resistive elements severally connected in the control grid-cathode circuits of the said thermionic discharge tubes, the said first and second plurality of resistive elements having values at which the said discharge tubes are rendered conducting and non-conducting at a predetermined time and for a predetermined interval in each cycle of frequency of the said control voltages, and a plurality of receiver gate circuits discretely controlled by a combination of the intelligence impulses of the said received signal and the pulsed output of the said distributor.

20. In a telegraph receiver according to claim 19, wherein the said receiver gate circuits comprise a plurality of multivibrators each having two conditions of stability, means to control selectively the said conditions of multivibrator stability in accordance with discrete combinations of the intelligence impulses of the said received signal and the pulsed output of the said distributor, and means to derive a receiver output responsive to the stability conditions of the said multivibrators.

21. In a telegraph signal receiver, a received signal comprising start, intelligence and stop impulses, a source of sinusoidal control voltages in quadrature relationship and of common frequency, a receiver distributor activated by the said source of potentials and having a timed, sequential and cyclic pulse output, means to derive an output signal in accordance with a combination of the intelligence impulses of the said received signal and pulse output of the said distributor, and means to render the said source of control voltages selectively operative and inoperative, said latter means comprising a thermionic discharge tube having first and second control electrodes, first and second resistive networks interposed between the said control voltages and the said first and second control electrodes, respectively, said first and second networks having values at which the said thermionic discharge tube is rendered conductive and non-conductive over predetermined portions of the frequency of the said voltages, means to derive a control pulse in accordance with the conductance and non-conductance of the said thermionic discharge tube, and means to activate and suppress selectively the said source of control voltages in accordance with combinations of the said derived control pulse with the start and stop impulses of the said received signal.

22. In a telegraph signal receiver according to claim 21, wherein the said source of oscillations includes a tuned circuit, and the said means to activate and suppress the said source of control voltages comprises a storage discharge tube having a conductive electron path in parallel with the said tuned circuit.

23. In a telegraph signal receiving system, signal responsive means, a normally dormant oscillator, oscillator starting means operable by said signal responsive means in response to the first of a plurality of equal length signal elements, a plurality of electron discharge tubes, a control connection between said oscillator and one of said tubes for causing a change in the conductivity of said one tube after the end of said first signal element, and control connections between said oscillator and others of said tubes for causing changes in the conductivity thereof individually and in succession at intervals substantially equal to the duration of said signal elements, said oscillator effecting said conductivity changes during one cycle of oscillation.

24. A telegraph signal receiving system according to claim 23, wherein the first-mentioned control connection effects said conductivity change substantially in mid-interval of the second of said signal elements.

References Cited in the file of this patent

UNITED STATES PATENTS

| Number | Name | Date |
|---|---|---|
| 2,153,178 | Fitch | Apr. 4, 1939 |
| 2,199,634 | Koch | May 7, 1940 |
| 2,210,577 | Fitch | Aug. 6, 1940 |
| 2,456,825 | Fitch | Dec. 21, 1948 |
| 2,468,462 | Rea | Apr. 26, 1949 |
| 2,479,020 | Pelmulder | Aug. 16, 1949 |
| 2,521,353 | Fitch | Sept. 5, 1950 |

FOREIGN PATENTS

| Number | Country | Date |
|---|---|---|
| 613,084 | Great Britain | Nov. 22, 1948 |